(12) United States Patent
Wang et al.

(10) Patent No.: US 12,346,803 B2
(45) Date of Patent: Jul. 1, 2025

(54) GENERATING A COMPRESSED REPRESENTATION OF A NEURAL NETWORK WITH PROFICIENT INFERENCE SPEED AND POWER CONSUMPTION

(71) Applicant: Futurewei Technologies, Inc., Plano, TX (US)

(72) Inventors: Wei Wang, Santa Clara, CA (US); Wei Jiang, Santa Clara, CA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 1181 days.

(21) Appl. No.: 17/139,825

(22) Filed: Dec. 31, 2020

(65) Prior Publication Data

US 2021/0125070 A1   Apr. 29, 2021

Related U.S. Application Data

(63) Continuation of application No. PCT/US2019/041566, filed on Jul. 12, 2019.

(60) Provisional application No. 62/697,251, filed on Jul. 12, 2018.

(51) Int. Cl.
    *G06N 3/08* (2023.01)
    *G06F 17/16* (2006.01)
    *G06N 3/04* (2023.01)

(52) U.S. Cl.
    CPC .......... *G06N 3/08* (2013.01); *G06F 17/16* (2013.01); *G06N 3/04* (2013.01)

(58) Field of Classification Search
    CPC .......... G06N 3/04; G06N 3/08; G06F 17/16
    See application file for complete search history.

(56) References Cited

U.S. PATENT DOCUMENTS

| | | | |
|---|---|---|---|
| 9,818,059 B1 * | 11/2017 | Woo | G06N 20/00 |
| 10,515,301 B2 * | 12/2019 | Li | G06N 3/02 |
| 10,572,409 B1 * | 2/2020 | Zejda | G06N 3/082 |
| 10,635,739 B1 * | 4/2020 | Batruni | G06N 20/00 |

(Continued)

OTHER PUBLICATIONS

Cheng, J., Wang, Ps., Li, G. et al. Recent advances in efficient computation of deep convolutional neural networks. Frontiers Inf Technol Electronic Eng 19, 64-77 (2018). https://doi.org/10.1631/FITEE.1700789 (Year: 2018).*

(Continued)

*Primary Examiner* — Jeremy L Stanley
(74) *Attorney, Agent, or Firm* — Pearl Cohen Zedek Latzer Baratz LLP

(57) ABSTRACT

The disclosure relates to technology for generating a compressed neural network. A weight tensor is received from a neural network to be compressed, and it is reordered to be compressed to have an inner two-dimensional (2D) shape and a 2D sparse bitmap. A layered structure is generated that represents the reordered weight tensor, and the reordered weight tensor is divided into a group of coefficients (GOCs). An encoding mode is selected to generate a quantized reordered weight tensor using one of a codebook or direct quantization, and a column swapped quantized reordered weigh tensor is generated. A compressed neural network is formed by encoding and the compressed representation of the neural network is transmitted to a target system for decompression.

22 Claims, 16 Drawing Sheets

(56) References Cited

U.S. PATENT DOCUMENTS

| | | | | |
|---|---|---|---|---|
| 10,810,484 | B2* | 10/2020 | Xie | G06F 7/5443 |
| 10,878,319 | B2* | 12/2020 | Alsharif | G06N 20/00 |
| 11,551,028 | B2* | 1/2023 | Baum | G06N 3/084 |
| 11,615,297 | B2* | 3/2023 | Baum | G06F 8/41 |
| | | | | 706/15 |
| 11,657,258 | B2* | 5/2023 | Zhang | G06N 3/063 |
| | | | | 706/15 |
| 11,715,002 | B2* | 8/2023 | Phanishayee | G06N 3/048 |
| | | | | 706/25 |
| 2003/0033264 | A1* | 2/2003 | Kirshenbaum | G06N 3/126 |
| | | | | 706/15 |
| 2016/0204795 | A1* | 7/2016 | Huang | H03M 13/6312 |
| | | | | 341/87 |
| 2016/0217341 | A1* | 7/2016 | Hung | H04N 19/197 |
| 2016/0217369 | A1* | 7/2016 | Annapureddy | G06N 3/082 |
| 2016/0307095 | A1* | 10/2016 | Li | G06N 3/02 |
| 2017/0068867 | A1* | 3/2017 | Lee | G06V 20/62 |
| 2017/0132511 | A1* | 5/2017 | Gong | G06N 3/0464 |
| 2017/0293659 | A1* | 10/2017 | Huang | H03M 7/3066 |
| 2018/0046895 | A1* | 2/2018 | Xie | G06N 3/063 |
| 2018/0046897 | A1* | 2/2018 | Kang | G06F 7/5443 |
| 2018/0046901 | A1* | 2/2018 | Xie | G06F 7/5443 |
| 2018/0089564 | A1* | 3/2018 | Tate | G06N 3/045 |
| 2018/0107925 | A1* | 4/2018 | Choi | G06F 17/16 |
| 2018/0107926 | A1* | 4/2018 | Choi | G06N 3/047 |
| 2018/0285733 | A1* | 10/2018 | Mellempudi | G06N 3/063 |
| 2018/0330235 | A1* | 11/2018 | Lin | G06N 3/063 |
| 2018/0373981 | A1* | 12/2018 | Hu | G06F 12/0207 |
| 2019/0012296 | A1* | 1/2019 | Hsieh | G06N 3/04 |
| 2019/0080239 | A1* | 3/2019 | Yang | G06N 3/063 |
| 2019/0087713 | A1* | 3/2019 | Lamb | G06F 7/5443 |
| 2019/0108436 | A1* | 4/2019 | David | G06N 3/086 |
| 2019/0188899 | A1* | 6/2019 | Moloney | G06T 17/05 |
| 2019/0266217 | A1* | 8/2019 | Arakawa | G06F 7/462 |
| 2019/0286989 | A1* | 9/2019 | Wang | G06F 8/20 |
| 2019/0318245 | A1* | 10/2019 | Song | G06F 9/5011 |
| 2019/0325340 | A1* | 10/2019 | Nitta | G06Q 10/109 |
| 2019/0325400 | A1* | 10/2019 | Nitta | G06Q 10/1091 |
| 2019/0340510 | A1* | 11/2019 | Li | G06N 3/045 |
| 2019/0347554 | A1* | 11/2019 | Choi | G06N 3/082 |
| 2019/0348997 | A1* | 11/2019 | Lee | H03M 7/3066 |
| 2019/0348999 | A1* | 11/2019 | Pal | H03M 7/4062 |
| 2019/0370642 | A1* | 12/2019 | Liu | H03M 7/425 |
| 2020/0051203 | A1* | 2/2020 | Nurvitadhi | G06F 9/3885 |
| 2020/0097831 | A1* | 3/2020 | Wang | G06N 3/082 |
| 2020/0110777 | A1* | 4/2020 | Yin | G06F 16/9024 |
| 2020/0159534 | A1* | 5/2020 | Li | G06F 9/30196 |
| 2020/0234137 | A1* | 7/2020 | Chen | G06N 3/084 |
| 2020/0250539 | A1* | 8/2020 | Liu | G06N 20/10 |
| 2020/0279133 | A1* | 9/2020 | Baum | G06V 10/82 |
| 2020/0285892 | A1* | 9/2020 | Baum | G06F 18/285 |
| 2020/0285949 | A1* | 9/2020 | Baum | G06N 3/04 |
| 2020/0285950 | A1* | 9/2020 | Baum | G06N 3/04 |
| 2021/0182077 | A1* | 6/2021 | Chen | G06F 7/5443 |
| 2021/0201526 | A1* | 7/2021 | Moloney | G06N 3/045 |

OTHER PUBLICATIONS

Han, S., Mao, H., Dally, W. Deep Compression: Compressing Deep Neural Networks with Pruning, Trained Quantization and Huffman Coding. ICLR 2016. https://doi.org/10.48550/arXiv.1510.00149. (Year: 2016).*

Goto, K. and van de Geijn, R. A. 2008. Anatomy of high-performance matrix multiplication. ACM Trans. Math. Softw. 34, 3, Article 12 (May 2008), 25 pages. DOI = 10.1145/1356052.1356053 http://doi.acm.org/10.1145/1356052.1356053 (Year: 2008).*

X. Xiu et al., "Palette-Based Coding in the Screen Content Coding Extension of the HEVC Standard," 2015 Data Compression Conference, Snowbird, UT, USA, 2015, pp. 253-262, doi: 10.1109/DCC.2015.79. (Year: 2015).*

H. Choi & I. Bajic., "Near-Lossless Deep Feature Compression for Collaborative Intelligence," Arxiv.org. https://doi.org/10.48550/arXiv.1804.09963 (Year: 2018).*

Kesheng Wu, W. Koegler, J. Chen and A. Shoshani, "Using bitmap index for interactive exploration of large datasets," 15th International Conference on Scientific and Statistical Database Management, 2003., Cambridge, MA, USA, 2003, pp. 65-74, doi: 10.1109/SSDM.2003.1214955. (Year: 2003).*

Laude, T., Richter, Y., Ostermann, J. Neural Network Compression using Transform Coding and Clustering. arXiv.org. https://doi.org/10.48550/arXiv.1805.07258. [retrieved from the Internet: https://arxiv.org/abs/1805.07258]. (Year: 2018).*

International Search Report & The Written Opinion of the International Searching Authority dated Oct. 28, 2019, International Application No. PCT/US2019/041566.

Dharma Teja Vooturi et al: "Efficient Inferencing of Compressed Deep Neural Networks", arxiv.org, Cornell University Library, 201 Olin Library Cornell University Ithaca, NY 14853, Nov. 1, 2017, XP081284118.

Yoojin Choi et al: "Universal Deep Neural Network Compression", arxiv.org, Cornell University Library, 201 Olin Library Cornell University Ithaca, NY 14853, Feb. 7, 2018, XP080857330.

Jian Cheng et al: "Recent Advances in Efficient Computation of Deep Convolutional Neural Networks", arxiv.org, Cornell University Library, 201 Olin Library Cornell University Ithaca, NY 14853, Feb. 3, 2018, XP081214571.

International Preliminary Report on Patentability dated Jan. 12, 2021, International Application No. PCT/US2019/041566.

* cited by examiner

GENERATING A COMPRESSED REPRESENTATION OF A NEURAL NETWORK WITH PROFICIENT INFERENCE SPEED AND POWER CONSUMPTION

CLAIM FOR PRIORITY

This application is a Continuation of and claims the benefit of priority to PCT/US2019/041566, filed Jul. 12, 2019, which claims the benefit of priority to U.S. Provisional App. Ser. No. 62/697,251, filed Jul. 12, 2018, the contents of which are hereby incorporated in their entirety.

FIELD

The disclosure generally relates to generation of a compressed neural network (NN), and in particular, to a compressed NN with increased inference speed and lower power consumption.

BACKGROUND

Machine learning describes a wide range of algorithms by which a computer can learn to solve a problem without being explicitly programmed. One class of machine learning algorithm is artificial neural networks. An artificial neural network comprises a set of interconnected nodes. One or more input nodes receive external input data. The input nodes apply an activation function to the input and may output the result to one or more other nodes (referred to as "hidden nodes"). The hidden nodes receive input from one or more previous nodes (i.e., the input nodes or another hidden node), applying different weighting factors to each input. The hidden nodes then apply an activation function in much the same way as the input nodes. The output is then passed on to additional nodes, which process it as input. This process continues until the original input has propagated through the artificial neural network and reaches one or more output nodes. An output node applies an activation function in the same manner as other nodes, but rather than passing its output to another node, it outputs a result.

A common approach in building neural networks is to train them using a training data set before using them to solve real problems. In the training phase, input data for which the correct answer is already known is provided to the neural network, and the resulting output is used to train the network by adjusting the input weightings for one or more nodes. Many trained neural networks employ tens or hundreds of millions of parameters to achieve good performance. Storing neural networks that employ a large number of parameters takes significant amount of storage space. Neural networks may be used on devices with limited storage space, for example, mobile devices. Furthermore, these neural networks may have to be transmitted via computer networks from one system to another. Transmitting such large neural networks via computer networks from one system to another can be a slow and inefficient process. Often times, in order to limit the size of the neural network for storage or transmission, the neural network may be compressed for storage and transmission, and decompressed by the computing device using the neural network.

BRIEF SUMMARY

According to one aspect of the present disclosure, there is provided a computer-implemented method of generating a compressed neural network, comprising receiving a weight tensor from a neural network to be compressed; reordering the weight tensor of the neural network to be compressed to have an inner two-dimensional (2D) shape of a 2D sparse bitmap; generating a layered structure comprising one or more layers to represent the reordered weight tensor; dividing the reordered weight tensor into one or more group of coefficients (GOCs); selecting an encoding mode to generate a quantized reordered weight tensor using one of a codebook or direct quantization by computing an encoding rate distortion measurement; generating a column swapped quantized reordered weight tensor by swapping columns of the quantized reordered weight tensor according to a plurality of column swapping indexes of the 2D sparse bitmap; encoding at least one of the column swapped quantized reordered weight tensor, the 2D sparse bitmap according to the layered structure, the codebook including a plurality of centroids, or the plurality of column swapping indexes to form a representation of the compressed neural network; and transmitting the compressed representation of the neural network to a target system.

Optionally, in any of the preceding aspects, the method further comprises generating the codebook of the plurality of centroids in response to the encoding mode selected to generate a quantized reordered weight tensor; and generating the quantized reordered weight tensor using the codebook of the plurality of centroids to represent the GOC by mapping the weight coefficients in the GOC to a corresponding one of the plurality of centroids.

Optionally, in any of the preceding aspects, the method further comprises generating the quantized reordered weight tensor using direct quantization.

Optionally, in any of the preceding aspects, the 2D sparse bitmap is determined by matching an underlying matrix multiplication General Block Panel Multiplication (GEBP) left-hand-side (lhs) matrix blocking structure.

Optionally, in any of the preceding aspects, the layered structure matches one of the underlying GEBP lhs matrix blocking structure, a quad-tree block structure, or is defined to efficiently represent the 2D sparse bitmap.

Optionally, in any of the preceding aspects, the encoding of the 2D sparse bitmap comprises: a depth-wise binary tree scanning order when there are more than one layer in the layered structure, and one of a row-wise raster order, a column-wise raster order, a zigzag order, an order that follows the General Panel Panel Multiplication (GEPP)/General Block Panel Multiplication (GEBP) or a General Panel Matrix Multiplication (GEPM)/GEBP matrix blocking structure when there is one layer in the layered structure.

Optionally, in any of the preceding aspects, the GOC is an arbitrarily predefined size or matches the sparse bitmap blocking structure when the reordered weight tensor is divided into multiple GOCs; and the GOC is the size of the reordered weight tensor when there is a single GOC for the reordered weight tensor.

Optionally, in any of the preceding aspects, the codebook of the plurality of centroids is determined by a clustering algorithm.

Optionally, in any of the preceding aspects, the mapping of the weight coefficients in the GOC further comprises: assigning each weight coefficient to a corresponding one of the plurality of centroids based on a distance between the each weight coefficient and the corresponding centroid; or determining whether the weight coefficient is an escape coefficient, and assigning each of the weight coefficients to a corresponding one of the plurality of centroids based on a distance between the weight coefficient and the corresponding one of the plurality of centroids when the weight coefficient is not an escape coefficient, and assigning the weight coefficient a special value when the weight coefficient is an escape coefficient.

Optionally, in any of the preceding aspects, the special value is the number of centroids in the codebook.

Optionally, in any of the preceding aspects, the generation of the codebook, further comprising: defining a maximum allowable size for a palette predictor having a plurality of centroids; initializing the codebook of the plurality of centroids using the weight coefficients from one of the one or more GOCs; comparing the codebook of the plurality of centroids with the palette predictor; replacing the plurality of centroids in the codebook with the plurality of centroids in the palette predictor based on a rate distortion selection; and iteratively updating the palette predictor with the plurality of centroids in the codebook after encoding each of the one or more GOCs.

Optionally, in any of the preceding aspects, the encoding rate distortion measurement is set to optimize compression quality, inference speed and power consumption.

According to still one other aspect of the present disclosure, there is a non-transitory computer-readable medium storing computer instructions for generating a compressed neural network, that when executed by one or more processors, cause the one or more processors to perform the steps of: receiving a weight tensor from a neural network to be compressed; reordering the weight tensor of the neural network to be compressed to have an inner two-dimensional (2D) shape of a 2D sparse bitmap; generating a layered structure comprising one or more layers to represent the reordered weight tensor; dividing the reordered weight tensor into one or more group of coefficients (GOCs); selecting an encoding mode to generate a quantized reordered weight tensor using one of a codebook or direct quantization by computing an encoding rate distortion measurement; generating a column swapped quantized reordered weight tensor by swapping columns of the quantized reordered weight tensor according to a plurality of column swapping indexes of the 2D sparse bitmap; encoding at least one of the column swapped quantized reordered weight tensor, the 2D sparse bitmap according to the layered structure, the codebook including a plurality of centroids, or the plurality of column swapping indexes to form a representation of the compressed neural network; and transmitting the compressed representation of the neural network to a target system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate elements.

DETAILED DESCRIPTION

Figure 1:
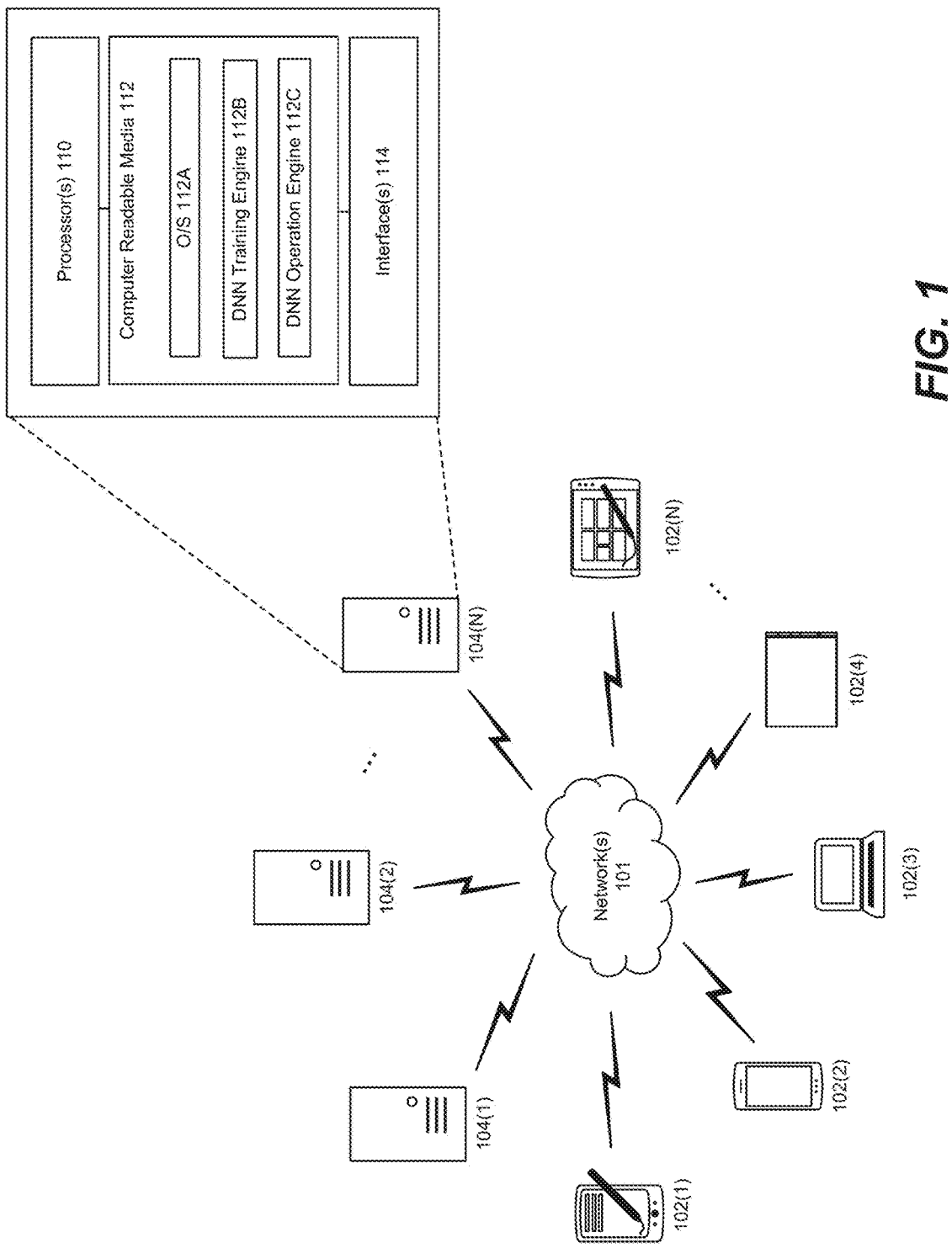
FIG. 1 illustrates an example system in which a deep neural network (DNN) training system can operate.

The present disclosure will now be described with reference to the figures.

The technology relates to generation of a compressed neural network (NN), and in particular, to a compressed NN weight tensor with increased inference speed and lower power consumption.

A weight tensor is received from a neural network to be compressed, where a weight tensor refers to, for example, a four-dimensional (4D) data container and each element in the data container is a floating number. The weight tensor is reordered to be compressed and to have an inner two-dimensional (2D) shape and a 2D sparse bitmap. A layered structure is generated that represents the reordered weight tensor, and the reordered weight tensor is divided into a group of coefficients (GOCs). An encoding mode is selected to generate a quantized reordered weight tensor using one of a codebook or direct quantization, and a column swapped quantized reordered weigh tensor is generated by swapping columns of the quantized reordered weight tensor. A compressed neural network is formed by encoding the data and the compressed representation of the neural network is transmitted to a target system for decompression and use.

It is understood that the present embodiments of the disclosure may be implemented in many different forms and that claim scope should not be construed as being limited to the embodiments set forth herein. Rather, these embodiments are provided so that this disclosure will be thorough and complete and will fully convey the inventive embodiment concepts to those skilled in the art. Indeed, the disclosure is intended to cover alternatives, modifications and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

Artificial neural networks have become an important tool for extraction of descriptors from multimedia content, classification, encoding of multimedia content and other applications. An example is provided by the video descriptors defined in ISO/IEC 15938-15. The efficient transmission and deployment of neural networks for multimedia applications require methods to compress these large data structures. This new part 17 of ISO/IEC 15938 defines tools for compression of neural networks for multimedia applications and representing the resulting bit-streams for efficient transport.

According to "Use cases and requirements for compressed representation of neural networks," ISO/IEC JTC1/SC29/WG11/N17924, October 2018, artificial neural networks have been adopted for a broad range of tasks in multimedia analysis and processing, media coding, data analytics and many other fields. While the underlying technology has been known for decades, the recent success is based on two main factors: (1) the ability to process much larger and complex neural networks (e.g., deep neural networks (DNNs)) than in the past, and (2) the availability and capacity of large-scale training data sets. These two aspects not only make trained networks powerful, but also mean that they contain a large number of parameters (weights), resulting in quite large sizes of the trained neural networks (e.g., several hundred MBs).

The neural networks used in an application can be improved incrementally (e.g., training on more data, including feedback from validation of results), so that updates of already deployed networks may be necessary. In addition, the neural networks for many applications (e.g., classification) start from neural network that has been pre-trained on a general dataset, and then adapted and retrained for the specific problem. Thus, different applications may use neural networks that share large parts among them.

In conventional application of neural network compression, it has been shown that significant compression is feasible, with no or only small impact on the performance of the neural network in a particular use case. As the description of the network topology is rather small compared to the parameters/weights, compression technology will in particular address compression of weights, e.g., by reducing their number, quantizing them, representing them more compactly etc.

Any use case, in which a trained neural network (and its updates) needs to be deployed to a number of devices, which potentially run on different platforms or in applications of different manufacturers, could benefit from a compressed representation of neural networks. Compression will enable an application to have smaller representations of neural networks sent across network connections, and potentially also neural networks having a smaller memory footprint during inference. While exchange formats for neural networks exist (e.g., ONNX, NNEF), they do not yet address compression and incremental updates. What is currently missing is a representation of the compressed parameters/weights of a trained network, complementing the description of the network structure/architecture in existing (exchange) formats for neural networks.

Some of the use cases or applications for compressed neural networks, as defined ISO/IEC JTC1/SC29/WG11/N17924, include but are not limited to, a camera application with object recognition, a translation application, large-scale public surveillance, visual pattern recognition (VPR), NN representation for devices with limited memory and bandwidth, efficient re-use of neural networks among different media applications, electronic health record and genomic data, dynamic adaptive media streaming, audio classification/acoustic scene classification, audio classification/sound event detection, personalized machine reading comprehension (MRC) application, a machine translation application, distributed training and evaluation of neural networks for media content analysis, compact descriptors for video analysis (CDVA), image/video compression, distribution of neural networks for content processing, etc.

FIG. 1 illustrates an example system in which a deep neural network (DNN) training system can operate. The system 100 includes one or more computing devices 102(1)-102(N), including servers 104(1)-014(N), that may communicate with one another via one or more networks 106. Networks 106 may be wired or wireless and include public networks or private networks including, but not limited to local area networks (LAN), wide area networks (WANs), satellite networks, cable networks, WiMaX networks, and communication networks, such as LTE and 5G networks. Networks 106 may also include any number of different devices that facilitate network communications, such as switches, routers, gateways, access points, firewalls, base stations, repeaters, backbone devices, etc.

Computing device(s) 102(1)-102(N) may include, but are not limited to, any number of various devices, such as client or server based devices, desktop computers, mobile devices, special purposes devices, wearable devices, laptops, tablets, cell phones, automotive devices, servers, telecommunication devices, network enabled televisions, games consoles or devices, cameras, set top boxes, personal data assistants (PDAs) or any other computing device configured to use a DNN training or operation as described herein. In one embodiment, computing devices 104(1)-104(N) may include one or more processor(s) 110 connected to one or more computer readable media 112. The processor(s) may operate to execute computer readable and executable instructions stored on the computer readable media 112, which may be for example, an operating system (O/S) 112A, a DNN training engine 112B, and DNN operation engine 112C, and other programs or applications executable by processor(s) 110.

Processor(s) 110 may include, but is not limited to, one or more single-core processors, multi-core processors, central processing units (CPUs), graphics processing units (GPUs), general purpose graphics processing units (GPGPUs) or hardware logic components, such as accelerators and field-programmable gate arrays (FPGAs), application-specific integrated circuits (ASICs), system-on-a-chip (SoCs), complex programmable logic devices (CPLDs) and digital signal processors (DSPs).

Computer readable media 112 (or memory) may include computer storage media and/or communication media, which may comprise tangible storage units such as volatile memory, non-volatile memory or other persistent or auxiliary computer storage media, removable and non-removable computer storage media implemented in any method or technology for storage of information such as computer readable instructions, data structures or other data. Computer readable media 112 may include tangible or physical forms of media found in device or hardware components, including but not limited to, random access memory (RAM), static RAM, dynamic RAM, read only memory (ROM), erasable programmable ROM (EPROM), electrically erasable programmable ROM (EEPROM), flash memory, optical storage, magnetic storage, storage arrays, network storage, storage area networks or any other medium that may be used to store and maintain information for access by a computing device, such as computer devices 102(1)-102(N) and 104(1)-104(N). In some embodiments, computer readable media 112 can store instructions executable by the processor(s) 110, which processor(s) 110 may be included in one or more of the computer devices 102(1)-102(N) and 104(1)-104(N). In still other embodiments, the computer readable media 112 may store an operating system which includes components to enable or direct the computing devices 102(1)-102(N) and 104(1)-104(N) to receive data via various input (e.g., memory devices, user controls, network interfaces, etc.) and process the data using processor(s) 110 to generate output (e.g., and image for display, data for storing in memory, etc.) and which may enable a user to interact with various units of the training engine 112B.

In the disclosed embodiment, the computer-readable media 112 includes O/S 112A, a DNN training engine 112B and a DNN operation engine 112C. The O/S 112A may include software that allows applications to execute on the computing devices 102(1)-102(N) and 104(1)-104(N) and manages hardware resources, including input devices (e.g., keyboard and mouse), output devices (e.g., displays and printers), network devices (e.g., routers, network connections, etc.) and storage device (e.g., internal and external drives). Additionally, the O/S 112A may provide services to facilitate the efficient execution and management of, and memory allocations for, additionally installed software applications.

DNN training engine 112B may be implemented by the computing devices 102(1)-102(N) and 104(1)-104(N) to train a neural network model, such as DNN 113B. In one embodiment, the DNN training engine 112B includes an algorithm or software 120 (executable by the processor(s)) to train one or more DNNs 113B. Training a DNN 113B may be performed by multiple nodes (e.g., computing devices) in parallel to reduce training time. Accordingly, the DNN training engine 112B (and/or O/S 112A and DNN operation engine 112C) may execute on one or more of the computing devices 102(1)-102(N) and 104(1)-104(N). The DNN training engine 112B will be described in more detail below with reference to FIG. 2. Once a DNN has been trained, operation of the trained DNN may then be implemented by a data analysis engine, such as DNN operation engine 112C, described below.

Computing device 102(1)-102(N) and 104(1)-104(N) can also include one or more communications interfaces 114 to enable wired or wireless communications between the computing device 102(1)-102(N) and 104(1)-104(N) involved in DNN training. Communications interface(s) 114 may include one or more transceiver devices, for example, network interface controllers (NICs) such as Ethernet NICs, to send and receive communications over a network, such as network 101. In one embodiment, the processor(s) 110 may exchange data through the communications interface 114. For example, the communications interface 114 may be a Peripheral Component Interconnect express (PCIe) transceiver. Other examples include the communications interface 114 being a transceiver for cellular, Wi-Fi, Ultra-wideband (UWB), BLUETOOTH or satellite transmissions. The communications interface 122 can include a wired I/O interface, such as an Ethernet interface, a serial interface, a Universal Serial Bus (USB) interface, an INFINIBAND interface other wired interfaces.

Figure 2:
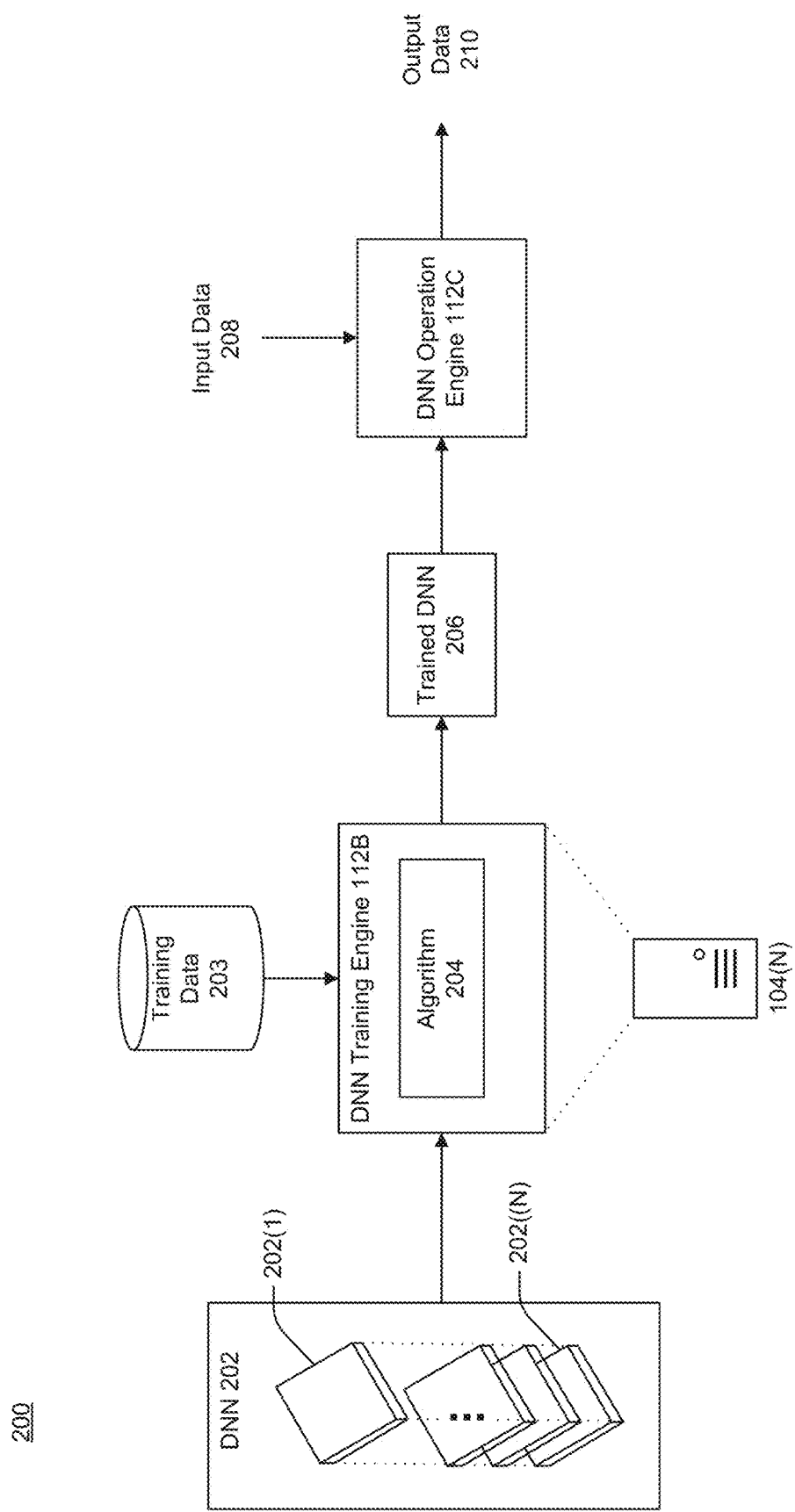
FIG. 2 illustrates an example system for implementing a training engine to train a DNN.

FIG. 2 illustrates an example system for implementing a training engine to train a DNN. The system 200 uses an algorithm, such as algorithm 204, to train one or more DNNs, and implements a data analysis engine, such as DNN operation engine 112C in which to operate the trained DNN 206. The training engine 112B and DNN operation engine 112C may be implemented using one or more computing devices, such as computing device 104(N). In one embodiment, the DNN training engine 112B and DNN operation engine may be implemented by the same computing device. In another embodiment, the DNN training engine 112B and DNN operation engine may be implemented by different computing devices. The computing device 104(N), as noted above, may include one or more processor(s) 110, which may exchange data through a bus or a network (not shown) as well as execute instructions of the DNN training engine 112B and the training data 203.

DNN training can be performed by multiple nodes (e.g. computing devices) in a parallel manner to reduce the time required for training. In one embodiment, the DNN training engine 112B uses an algorithm 204 to train the DNN 202 to perform data analysis. In the example as illustrated, the DNN 202 is a multi-layer perceptron (MLP) or artificial neural network (ANN). Accordingly, the DNN 202 may include an input layer 202(N) and an output layer 202(1), and one or more hidden layers (layers in between the input and output layers). The training data 203 may be used by the algorithm 204 to train the DNN 202. In one embodiment, the training data 203 may include a collection of audio data that includes speech samples. For example, the audio data may include speech samples collected from speakers in North America or other languages, such as Chinese, Japanese or French. Still other kinds of training data may be collected for different applications such as handwriting recognition or image classification.

In one embodiment, computations performed by the algorithm 204 may be parallelized across processor(s) 110 and across different computing devices 104(N). For example, during back-propagation, a computation on input data 208 performed by a first processor 110 may produce a first computation result. The first computation result may be pipelined to a second processor 110 for further computation to generate a second computation result. Concurrent with the generation of the second computation result, the first processor 110 may be processing additional input data 208 to generate a third computation result. Similarly, concurrent with the generation of the second computation result, the first processor 110 may be transferring at least part of the first computation result to another processor 110. Such concurrent computations by the processors 110 may result in a pipelining of computations that train the DNN 204. Accordingly, computation time may be reduced due to the resulting parallelism of computation.

By using the algorithm 204 together with the training data 203, the DNN training engine 12B may produce trained DNN 206 from the DNN 202. DNN operation engine 112C may then use the trained DNN 206 to produce output data 210 from the input data 208. For example, the DNN operation engine 112C may perform pattern recognition and data analysis, such as speech recognition, speech synthesis, regression analysis or other data fitting, image classification, or face recognition (e.g., face recognition for determining driver distraction or images of a face in photos). In one specific example, a speech-to-text engine uses the trained DNN in the form of trained context-dependent DNN-Hidden Markov Models (HMMs). The speech-to-text engine may use the trained context-dependent DNN-HMMs to produce output data in the form of output text from input data in the form of input speech. In various embodiments, the operation engine 112C may receive input data from a microphone and audio processing components (e.g., a smartphone) or from a media file or stream, for example, for audio-indexing of the spoken content in the media file/stream. The DNN operation engine 112C may also be a text-to-speech engine that uses the trained context-dependent DNNs to synthesize output speech (output data) based on input text (input data), or a handwriting-recognition engine. Similarly, the DNN operation engine 112C may receive image data from a camera or image processing components or a media file or stream. The input data may use a trained DNN 206 to recognize the output images (output data) 210 based on input images (input data) 208.

In one further embodiment, the computing device 104(N) may include a data store (not shown) that has data storage, such as a database or data warehouse. In one embodiment, data store includes a relational database with one or more tables, arrays, indices, stored procedures and the like which enable data access including one or more of hypertext markup language (HTML) tables, resource description framework (RDF) tables, web ontology language (OWL) tables, extensible markup language (XML) tables, etc. Data stored in data store may include, but is not limited to, data for the operations of processes, applications, components or modules stored in computer-readable media 112 or executed by processor(s) 110. In one embodiment, the data store stores training data 203, a DNN 202 or other mathematical model, a trained DNN 206 or any combination thereof.

Additional DNNs and convolutional neural networks (CNNs) are described below with reference to the various figures.

Figure 3:
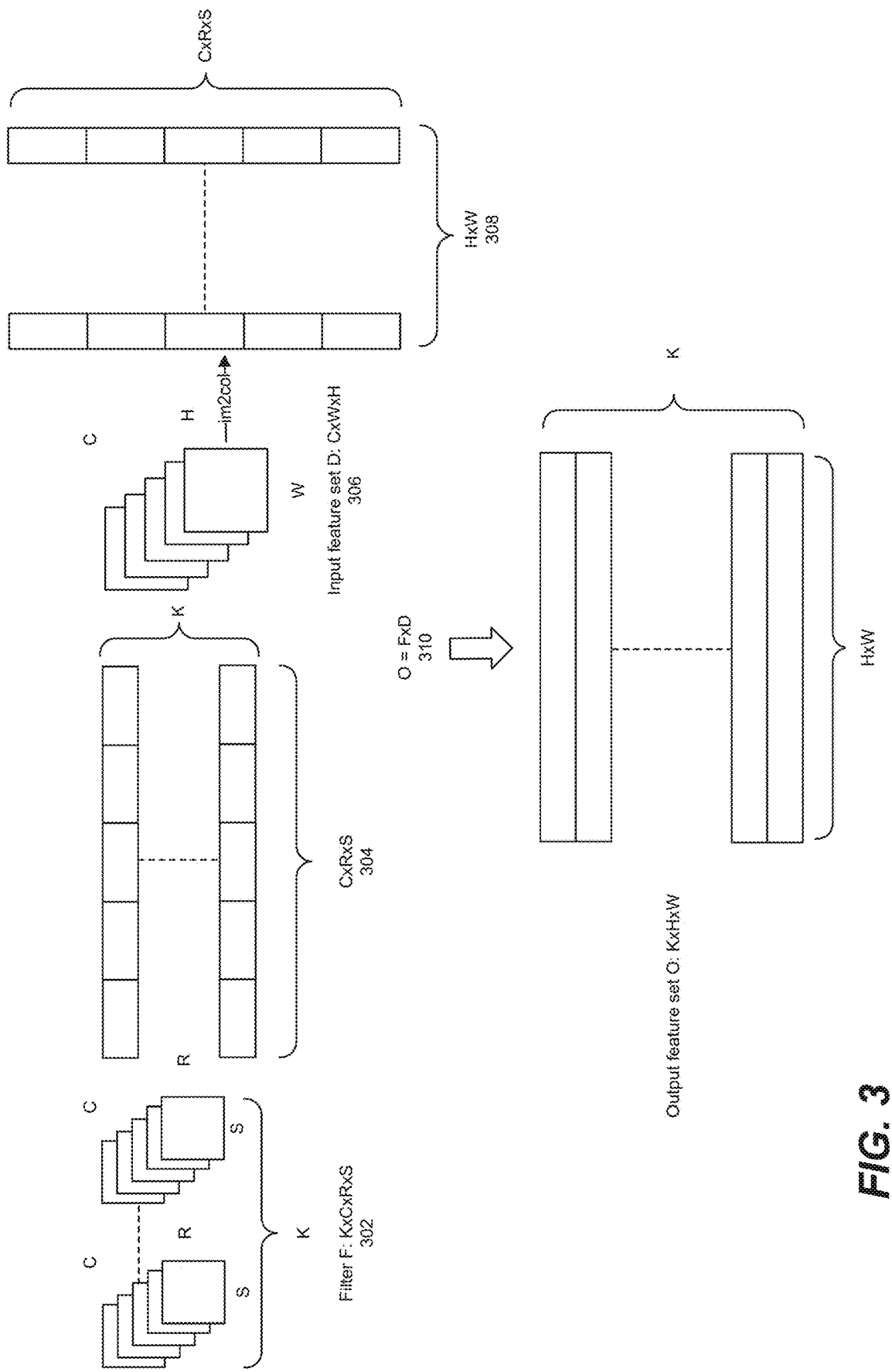
FIG. 3 illustrates an example convolutional operation.

FIG. 3 illustrates an example convolutional operation. Deep CNNs have been successful at reducing storage and computational costs of large neural networks. As the number of layers and nodes in these networks increases, and devices (e.g., mobile devices) implementing these networks increasing have limited memory and computational resources, there exists a need to continually reduce storage and computational costs. Many conventional techniques exist to implement a convolutional operation—Caffe uses direct convolution using im2col (a method of rearranging image blocks into columns), Caffe2 uses Fast Fourier Transform (FFT) based convolution, and Tensorflow uses Winograd based convolution. In the examples that follow, and for purposes of discussion, if an input feature map is $D \in \mathbb{R}^{CHW}$ and a convolution filter is $F \in \mathbb{R}^{KCRS}$, the output feature map is represented by $O \in \mathbb{R}^{KPQ}$, where P=f(H, R, u, pad_h) and Q=f(W, S, v, pad_w). That is, the height and width of the output feature map depend on the height and width of the input feature map and filter, as well as the choice of padding and striding. The variables are defined in Table I.

TABLE I

| | |
|---|---|
| C | Number of input feature maps |
| H | Height of input image |
| W | Width of input image |
| K | Number of output feature maps |
| R | Height of filter kernel |
| S | Width of filter kernel |
| u | Vertical stride |
| v | Horizontal stride |
| pad_h | Height of zero-padding |
| pad_w | Width of zero-padding |

In the example embodiment, a direct convolution using im2col is illustrated. Filter (F) 302 is reshaped to a two-dimensional (2D) matrix F[K, C×R×S] 304, and the input feature map (D) 306 is reshaped to 2D matrix D[C×R×S, H×W] 308 after applying im2col([R, S]) to each pixel in the input feature map. The resulting output feature map 310 is O=F·D ('·' indicates matrix multiplication).

Figure 4:
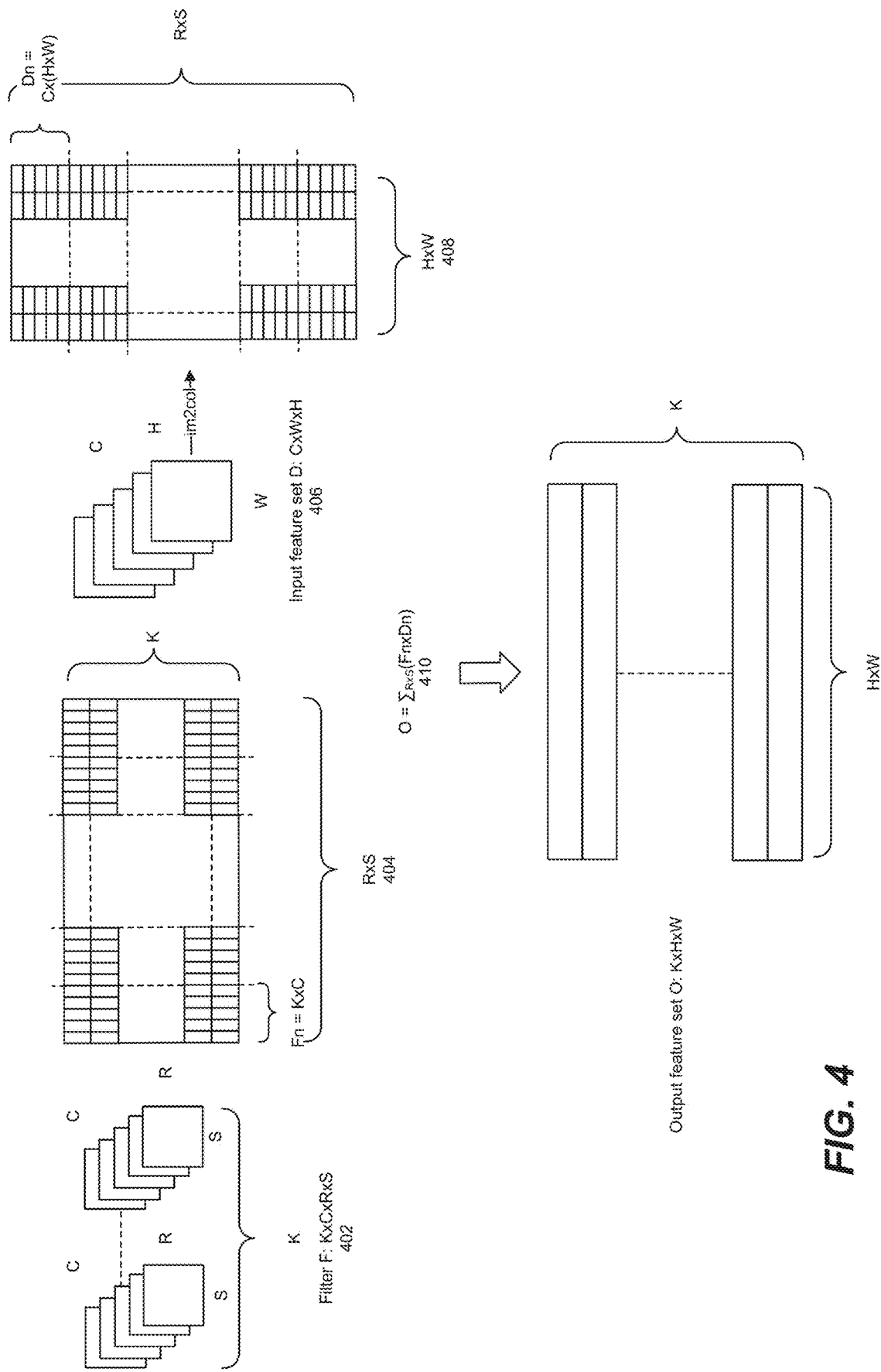
FIG. 4 illustrates another example convolutional.

FIG. 4 illustrates another example convolutional. The convolutional operation illustrated is a direct convolution using im2col, axis reorder. Filter (F) 402 may also be reshaped and reordered to form a [1, R×S] matrix 404, where each element of the matrix $F_n$ is a [K, C] sub-matrix. The input feature map (D) 406 can be reshaped and reordered to form a [R×S, 1] matrix 408, where each element of the matrix $D_n$ is a [C, H×W] sub-matrix. The output feature map 410 may then be generated as $O = \Sigma_{R \times S} F_n \cdot D_n$.

An advantage to FFT based convolution is that it provides a great speed-up for large kernels by transforming the input feature and kernel in a Fourier domain and multiplies them together to generate transformed output feature. A reverse transfer is then performed to generate the output feature in a pixel domain. However, as most CNNs adopt deep layers with a small kernel (such as 3×3), Winograd based convolution outperforms FFT based convolution under these circumstances.

Applying the Winograd method, the output feature matrix is calculated using formula ('⊙' indicates element-wise matrix multiplication):

$$o = a^T \cdot [(b \cdot f \cdot b^T) \odot (c^T \cdot d \cdot c)] \cdot a$$

For the output feature matrix o[2, 2] and kernel f[3, 3] configuration, the input feature matrix d is a 4×4 matrix. Therefore, matrices a, b and c are:

$$a^T = \begin{bmatrix} 1 & 1 & 1 & 0 \\ 0 & 1 & -1 & -1 \end{bmatrix}, b = \begin{bmatrix} 1 & 0 & 0 \\ 1/2 & 1/2 & 1/2 \\ 1/2 & -1/2 & 1/2 \\ 0 & 0 & 1 \end{bmatrix}, c^T = \begin{bmatrix} 1 & 0 & -1 & 0 \\ 0 & 1 & 1 & 0 \\ 0 & -1 & 1 & 0 \\ 0 & 1 & 0 & -1 \end{bmatrix}.$$

A vec operator is then defined to create a column vector from matrix A by stacking the column vectors of $A = [a_1\ a_2\ \ldots\ a_n]$ below one another. For matrix multiplication of Y=M·X·N, a Kronecker product may be applied so that $Y_{vec} = (N^T \lfloor M) \cdot X_{vec}$ (where '$\lfloor$' indicates the Kronecker product of two matrixes). Given that the number of input feature maps is C, one output feature is calculated by summing all of the convolution result between the input features and its responding kernels. The Winograd formula can be implemented according to the following procedure:

1. $F_{w\_vec}$=reshaping along outer axis of ($B \cdot F_{vec}$) to form a [N] elements vector, each vector element $F_{w\_vec}[n]$ is a [K, C] matrix.
2. $D_{w\_vec}$=reshaping along outer axis of ($C \cdot D_{vec}$) to form a [N] elements vector, each vector element $D_{w\_vec}[n]$ is a [C, number_input_tile] matrix.
3. $O_{w\_vec} = F_{w\_vec} \odot D_{w\_vec}$ (⊙· indicates element-wise multiplication of vector $F_{w\_vec}$ and $D_{w\_vec}$, while matrix multiplication is performed for each element pair since they are 2D matrices, $O_{w\_vec}$ is a [N] elements vector, each vector element $O_{w\_vec}[n]$ is a [K, number_input_tile] matrix.
4. $O_{vec} = A \cdot O_{w\_vec}$.
5. Generate final output feature map O by reshaping $O_{vec}$ to its proper output layout.

The Winograd configuration of the output feature matrix o[2, 2] and kernel f[3, 3] is used in a Tensorflow convolution layer implementation. The definition and dimension of each tensor in the Tensorflow implementation are listed in Table II below. Under this configuration, the dimension of $F_{w\_vec}$ is [16, [K, C]], the dimension of $D_{w\_vec}$ is [16, [C, number_input_tile]], and the dimension of $O_{w\_vec}$ is [16, [K, number_input_tile]].

TABLE II

| | | |
|---|---|---|
| $B = b \otimes b$ | filter transform matrix | [16, 9] |
| $C = c^T \otimes c^T$ | input data transform | [16, 16] |

TABLE II-continued

| | matrix | |
|---|---|---|
| $A = a^T \otimes a^T$ | output transform matrix | [4, 16] |
| $F_{vec}$ | vectorized filter tile | [9, [K, C]] |
| $F_{w\_vec}$ | $F_{vec}$ in Winograd domain | [16, [K, C]] |
| $D_{vec}$ | vectorized input tile | [16, [C, number_input_tile]] |
| $D_{w\_vec}$ | $D_{vec}$ in Winograd domain | [16, [C, number_input_tile]] |
| $O_{w\_vec}$ | $O_{vec}$ in Winograd domain | [16, [K, number_input_tile]] |
| $O_{vec}$ | vectorized output tile | [4, [K, number_input_tile]] |
| O | reshaped output tile | [2, 2, K, number_input_tile] |

For the Winograd configuration of output feature matrix o[2, 2] and kernel f[3, 3], matrices A, B and C are:

$$A = \begin{bmatrix} 1 & 1 & 1 & 0 & 1 & 1 & 1 & 0 & 1 & 1 & 1 & 0 & 0 & 0 & 0 & 0 \\ 0 & 1 & -1 & -1 & 0 & 1 & -1 & -1 & 0 & 1 & -1 & -1 & 0 & 0 & 0 & 0 \\ 0 & 0 & 0 & 0 & 1 & 1 & 1 & 0 & -1 & -1 & -1 & 0 & -1 & -1 & -1 & 0 \\ 0 & 0 & 0 & 0 & 0 & 1 & -1 & -1 & 0 & -1 & 1 & 1 & 0 & -1 & 1 & 1 \end{bmatrix}$$

$$B = \begin{bmatrix} 1 & 0 & 0 & 0 & 0 & 0 & 0 & 0 & 0 \\ 1/2 & 1/2 & 1/2 & 0 & 0 & 0 & 0 & 0 & 0 \\ 1/2 & -1/2 & 1/2 & 0 & 0 & 0 & 0 & 0 & 0 \\ 0 & 0 & 1 & 0 & 0 & 0 & 0 & 0 & 0 \\ 1/2 & 0 & 0 & 1/2 & 0 & 0 & 1/2 & 0 & 0 \\ 1/4 & 1/4 & 1/4 & 1/4 & 1/4 & 1/4 & 1/4 & 1/4 & 1/4 \\ 1/4 & -1/4 & 1/4 & 1/4 & -1/4 & 1/4 & 1/4 & -1/4 & 1/4 \\ 0 & 0 & 1/2 & 0 & 0 & 1/2 & 0 & 0 & 1/2 \\ 1/2 & 0 & 0 & -1/2 & 0 & 0 & 1/2 & 0 & 0 \\ 1/4 & 1/4 & 1/4 & -1/4 & -1/4 & -1/4 & 1/4 & 1/4 & 1/4 \\ 1/4 & -1/4 & 1/4 & -1/4 & 1/4 & -1/4 & 1/4 & -1/4 & 1/4 \\ 0 & 0 & 1/2 & 0 & 0 & -1/2 & 0 & 0 & 1/2 \\ 0 & 0 & 0 & 0 & 0 & 1 & 0 & 0 & 0 \\ 0 & 0 & 0 & 0 & 0 & 1/2 & 1/2 & 1/2 \\ 0 & 0 & 0 & 0 & 0 & 1/2 & -1/2 & 1/2 \\ 0 & 0 & 0 & 0 & 0 & 0 & 0 & 0 & 1 \end{bmatrix},$$

$$C = \begin{bmatrix} 1 & 0 & -1 & 0 & 0 & 0 & 0 & -1 & 0 & 1 & 0 & 0 & 0 & 0 & 0 \\ 0 & 1 & 1 & 0 & 0 & 0 & 0 & 0 & -1 & -1 & 0 & 0 & 0 & 0 & 0 \\ 0 & -1 & 1 & 0 & 0 & 0 & 0 & 0 & 1 & -1 & 0 & 0 & 0 & 0 & 0 \\ 0 & 1 & 0 & -1 & 0 & 0 & 0 & 0 & -1 & 0 & 1 & 0 & 0 & 0 & 0 \\ 0 & 0 & 0 & 0 & 1 & 0 & -1 & 0 & 1 & 0 & -1 & 0 & 0 & 0 & 0 \\ 0 & 0 & 0 & 0 & 0 & 1 & 1 & 0 & 0 & 1 & 1 & 0 & 0 & 0 & 0 \\ 0 & 0 & 0 & 0 & 0 & -1 & 1 & 0 & 0 & -1 & 1 & 0 & 0 & 0 & 0 \\ 0 & 0 & 0 & 0 & 0 & 1 & 0 & -1 & 0 & 1 & 0 & -1 & 0 & 0 & 0 \\ 0 & 0 & 0 & 0 & -1 & 0 & 1 & 0 & 1 & 0 & -1 & 0 & 0 & 0 & 0 \\ 0 & 0 & 0 & 0 & 0 & -1 & -1 & 0 & 0 & 1 & 1 & 0 & 0 & 0 & 0 \\ 0 & 0 & 0 & 0 & 0 & 1 & -1 & 0 & 0 & -1 & 1 & 0 & 0 & 0 & 0 \\ 0 & 0 & 0 & 0 & 0 & -1 & 0 & 1 & 0 & 1 & 0 & -1 & 0 & 0 & 0 \\ 0 & 0 & 0 & 0 & 1 & 0 & -1 & 0 & 0 & 0 & 0 & -1 & 0 & 1 & 0 \\ 0 & 0 & 0 & 0 & 0 & 1 & 1 & 0 & 0 & 0 & 0 & -1 & -1 & 0 \\ 0 & 0 & 0 & 0 & 0 & -1 & 1 & 0 & 0 & 0 & 0 & 1 & -1 & 0 \\ 0 & 0 & 0 & 0 & 0 & 1 & 0 & -1 & 0 & 0 & 0 & 0 & -1 & 0 & 1 \end{bmatrix}$$

As appreciated from the description above, corresponding to FIGS. 3 and 4, the direct convolution method using im2col is a matrix multiplication of 2D matrix [K, C] and [C, H×W], and the Winograd based convolution method is similarly a matrix multiplication of 2D matrix [K, C] and [C, number_input_tile]. Accordingly, it follows that high efficiency matrix multiplication General Block Panel Multiplication (GEBP) is a primary feature of convolution implementation.

Figure 5:
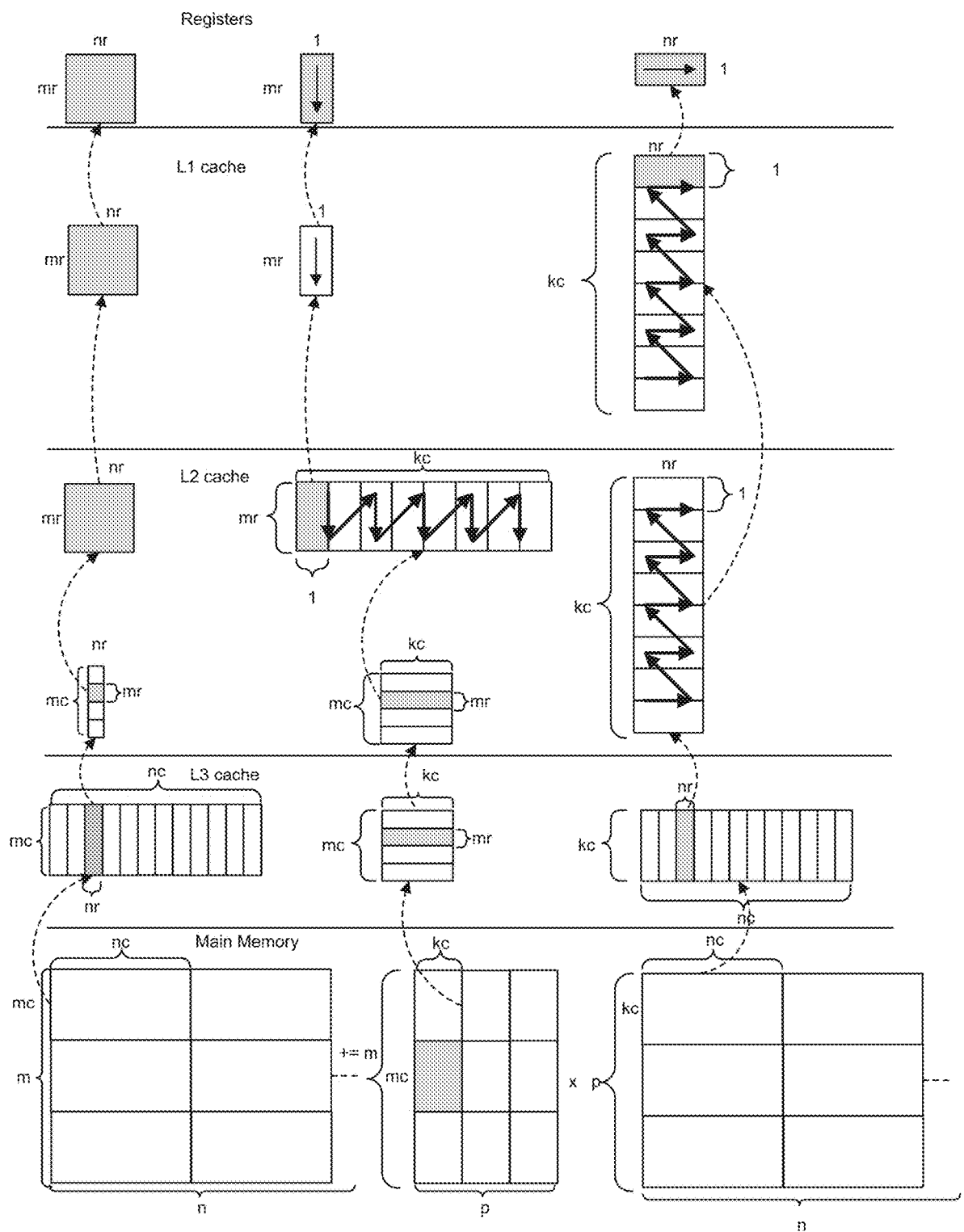
FIG. 5 illustrates an example memory hierarchy when performing a GEBP operation or GEPP operation.

FIG. 5 illustrates an example memory hierarchy when performing a GEBP operation (or General Panel Multiplication (GEPP) operation). Taking an example, and for purposes of discussion, where C+=A·B, and A, B and C are [(m×k), (k×n)], and [m×n] respectively, A, B and C are split into sub-blocks such that the multiplication operation can take full advantage of underlying hardware memory, cache, register and arithmetic logic unit (ALU) resources. The sub-blocks A, B and C are illustrated from left to right in the diagram. As shown, A[m, p] is partitioned to column panels $A_{main}$[m, kc]; $A_{main}$[m, kc] is partitioned to row panels $A_{L2}$[mc, kc]; $A_{L2}$[mc, kc] is partitioned to row panels $A_{L2r}$[mr, kc]; $A_{L2r}$[mr, kc] is partitioned to columns panel $A_{reg}$[mr, 1]; B[p, n] is partitioned to column panels $B_{main}$[p, nc]; $B_{main}$[p, nc] is partitioned to row panels $B_{L3}$[kc, nc]; $B_{L3}$[kc, nc] is partitioned to column panels $B_{L1}$[kc, nr]; $B_{L1}$[kc, nr] is partitioned to row panels $B_{reg}$[1, nr]; Inner kernel brings the next $A_{L2}$[mc, kc] to L2 cache, $B_{L3}$[kc, nc] to L3 cache, and $B_{L1}$[kc, nr] from L3 to L1 cache. It also brings the next $A_{reg}$[mr, 1] and $B_{reg}$[1, nr] to the register array; Inner kernel calculates $C_{reg}$[mr, nr]=$A_{reg}$[mr, 1]·$B_{reg}$[1, nr] in the register domain; and the inner kernel calculation is repeated, followed by repeating Inner kernel brings next $A_{L2}$[mc, kc] to L2 cache, $B_{L3}$[kc, nc] to L3 cache, and $B_{L1}$[kc, nr] from L3 to L1 cache. $A_{reg}$[mr, 1] and $B_{reg}$[1, nr] are then brought to the register array, until all blocks of matrix multiplication are completed.

Although not illustrated, a conventional memory hierarchy when performing General Panel Matrix Multiplication (GEPM)/General Block Panel Multiplication (GEBP) operation is similar to the GEBP/GEPP operation. Using this technique, A[m, p] is partitioned to row panels $A_{main}$[mc, p]; $A_{main}$[mc, p] is partitioned to column panels $A_{L2}$[mc, kc]; $A_{L2}$[mc, kc] is partitioned to row panels $A_{L2r}$[mr, kc]; $A_{L2r}$[mr, kc] is partitioned to columns panel $A_{reg}$[mr, 1]; B[p, n] is partitioned to column panels $B_{main}$[p, nc]; $B_{main}$[p, nc] is partitioned to row panels $B_{L3}$[kc, nc]; $B_{L3}$[kc, nc] is partitioned to column panels $B_{L1}$[kc, nr]; $B_{L1}$[kc, nr] is partitioned to row panels $B_{reg}$[1, nr]; Inner kernel brings next $A_{L2}$[mc, kc] to L2 cache, $B_{L3}$[kc, nc] to L3 cache, and $B_{L1}$[kc, nr] from L3 to L1 cache. $A_{reg}$[mr, 1] and $B_{reg}$[1, nr] are then brought to the register array; Inner kernel calculates $C_{reg}$[mr, nr]=$A_{reg}$[mr, 1]·$B_{reg}$[1, nr] in the register domain; followed by repeating the Inner kernel brings next $A_{L2}$[mc, kc] to L2 cache, $B_{L3}$[kc, nc] to L3 cache, and $B_{L1}$[kc, nr] from L3 to L1 cache, until all blocks of matrix multiplication are completed.

Based on the above description, matrix A is more efficient if stored in a column-major order, or $A_{L2r}$[mr, kc] is transposed to become a column-major order, so that inner kernel can access $A_{L2r}$ in a continuous manner.

FIGS. 6A-6D illustrate examples of different sparse structures in CNNs. There are several methods to reduce the storage of large neural networks having a larger amount of layers and nodes (e.g., computing devices). Such methods include, but are not limited to, weight pruning so that a dense tensor can be represented by sparse tensor, low-rank factorization so that a large tensor can be represented by two small tensors, designing special structural convolution filters with fewer weight parameters, and training a small neural network from a large neural network.

Both weight pruning and low-rank factorization methods are able to take a pre-trained model and perform a pruning or factorization process. The parameters used in pruning or factorization can also be quantized to binary, ternary, 4-bit, 8-bit, or X-bit value, or k-means scalar quantization can be applied to the parameter values. For example, Tensorflow Lite utilizes an 8-bit quantization method that takes a maximum and a minimum value from one layer and quantizes the parameter using the quantization step (max-min)/256.

Figure 6B:
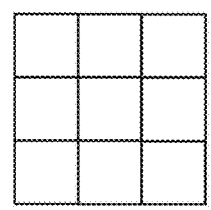
FIGS. 6A-6D illustrate examples of different sparse structures in CNNs.
Figure 6B:
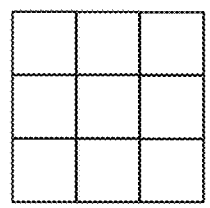
Figure 6B:
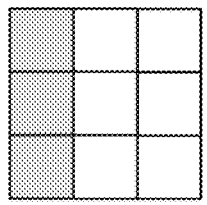
Figure 6B:
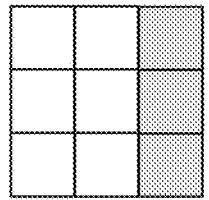
Figure 6D:
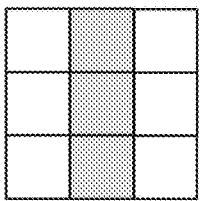
Figure 6D:
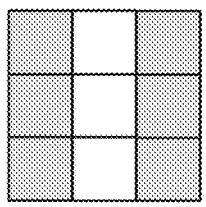
Figure 6A:
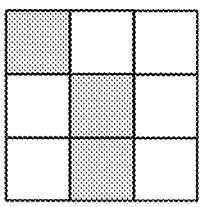
Figure 6A:
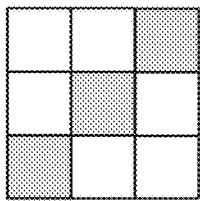
Figure 6C:
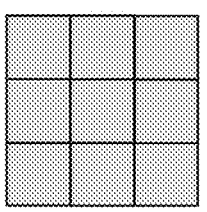
Figure 6C:
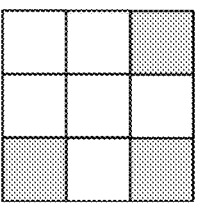
Figure 6C:
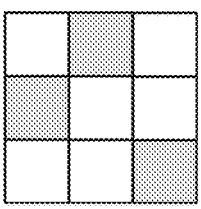

As illustrated, weight pruning structures may include fine-grained sparsity (FIG. 6A), vector-level sparsity (FIG. 6B), kernel-level sparsity (FIG. 6C) and filter-level sparsity (FIG. 6D). While, the fine-grained sparsity method offers a good compression ratio, it does not increase inference speed due to the irregularity of the fine-grained sparse. Similarly, the low-rank factorization method offers a good compression ratio. However, it does not increase the inference speed due to the dense property of the restored tensor. Since this method does not have prior knowledge of the parameter values of the restored tensor before they are generated, multiple multiplications are required, wasting processing time and power consumption. Other methods, such as vector-level sparse method (which explores the sparse structure within individual kernels by setting row/column of parameters to zero) and the kernel-level and filter-level (which set the parameters in one kernel or one filter to zero) bring slower performance speeds since most state-of-the-art CNNs adopt deep layers with a small kernel (e.g., 3×3).

The disclosure that follows presents various embodiments to increase neural network storage size, increase inference speed and address power consumption issues. Such embodiments may be implemented, for example, in the systems illustrated in FIGS. 1 and 2, as well as being deployed in desktop CPUs, embedded CPUs and ASIC platforms (for example, without GPU). The embodiments discussed below are well suited to work with existing methods, such as the direct convolution method, Winograd based convolution method and low-rank factorization method (discussed above).

For the direct convolution method, the convolution filter is reshaped from F∈$\mathbb{R}^{KCRS}$ to F∈$\mathbb{R}^{RSCK}$, where each element of the [R, S] kernel tensor $F_{RS}$∈$\mathbb{R}^{CK}$ (column-major order or transpose of the lhs matrix of GEBP operation) is a 2D matrix [C, K]. The input feature map (output feature map from previous layer, after a rectified linear unit (relu) operation (an activation function operation), max pooling operation and im2col process) is reshaped to D∈$\mathbb{R}^{RSCHW}$, where each element of the [R, S] input feature map tensor $D_{RS}$∈$\mathbb{R}^{CHW}$ (rhs matrix of GEBP operation) is also a 2D matrix [C, H×W].

For the Winograd based convolution method, each element of the [16] kernel tensor $F_{RS}$∈$\mathbb{R}^{CK}$ is a 2D matrix [C, K]. It is appreciated that the solution also works with other shapes of the F. The input feature map (output feature map from previous layer, after relu operation, max pooling operation and Winograd transformation) is reshaped to D∈$\mathbb{R}^{16CHW}$, where each element of the [16] input feature map tensor $D_{RS}$∈$\mathbb{R}^{CHW}$ is a 2D matrix [C, H×W]. Similarly, the solution works with other shapes of D as well.

As an initial step, a neural network or deep neural network (DNN) is trained. The training process includes defining a sparse bitmap, such as a 2D [C, K] sparse bitmap, to represent a sparse structure that matches an underlying GEBP lhs matrix blocking structure (described below) for each element of the kernel tensor $F_{RS}$. In one embodiment, the DNN may be newly trained or may comprise a pre-trained DNN. A sparse operation may be performed to $F_{RS}$ during the training (or retraining) process. When performing the sparse operation, the weight parameter may be arbitrarily changed and/or the DNN cost function may be changed such that the weight matrix has more Z[1, mr] rows, more Z[kc, mr] blocks, more Z[kc, mc] blocks, more Z[kc, K] blocks, or more Z [C, K] blocks, where "Z" indicates that all parameters in this block are zero. Optionally, a column swap operation can then be performed if the sparse operation generates more Z[1, mr] rows, more Z[kc, mr] blocks, more Z[kc, mc] blocks, more Z[kc, K] blocks, or more Z [C, K] blocks (the operation will result in a corresponding row swap in final GEBP output). In one embodiment, if the sparse filter tensor is represented by a direct sparse compression, the k-means method is used to group non-zero parameters to k-means indices. Otherwise, if the sparse filter tensor is represented by a low-rank factorization, the k-means method is used to group parameters in low-rank matrixes to k-means indices. Additionally, the input feature map may be a sparse tensor during the training process. For example, each element of the sparse input feature tensor $D_{RS}$, a 2D [C, H×W] sparse bitmap may be defined to represent a sparse structure that matches with underlying the GEBP rhs matrix blocking structure, described below.

After training the DNN, the sparse filter tensor is compressed. If the sparse filter tensor is represented by direct or Winograd sparse compression, then lossless compress the reordered column index (optional), lossless compress the layered sparse bitmap and k-means indices of non-zero parameters, and compress the k-means/escape values progressively. If the sparse filter tensor is represented by low-rank factorization, then lossless compress the reordered column index (optional), lossless compress the layered sparse bitmap and k-means indices of parameters in the low-rank matrixes, and compress the k-means/escape values progressively.

Once the filter tensor is compressed, the sparse output feature map (which will be the input feature map for the next layer) is compressed. For a direct convolution method, the sparse output feature map is quantized and compressed (after a relu operation, a max pooling operation and an im2col process). For a Winograd based convolution method, the sparse output feature map is quantized and compressed (after a relu operation, a max pooling operation and a Winograd transformation). Then, lossless compress reordered column index (optional), lossless compress layered sparse bitmap and k-means indices of non-zero parameters, and the compress k-means/escape values.

Following compression, an inference process is performed. For a direct convolution method, a customized layer is created such that the compressed sparse output feature map (input feature map for next layer) and its layered sparse bitmap is generated after the relu layer, the max pooling layer (if implemented), and the im2col operation. The layered sparse bitmaps from both filter tensor and input feature map are used as additional inputs to GEBP such that it skips the operation for Z[1, mr], Z[kc, mr], Z[kc, mc], Z[kc, K], Z[C, K] block in the lhs matrix, or Z[1, nr], Z[kc, nr], Z[kc, nc], Z[C, nc], Z[C, H×W] block in the rhs matrix. For a Winograd based convolution method, a customized layer is created such that the compressed sparse output feature map (input feature map for next layer) and its layered sparse bitmap is generated after the relu layer, max pooling layer (if implemented), and the Winograd transformation. The layered sparse bitmaps from both filter tensor and input feature map are then used as additional inputs to GEBP so that it skips the operation for Z[1, mr], Z[kc, mr], Z[kc, mc], Z[kc, K], Z[C, K] block in the lhs matrix, or Z[1, nr], Z[kc, nr], Z[kc, nc], Z[C, nc], Z[C, H×W] block in the rhs matrix.

Sparse Bitmap Layout of Kernel Sensor

Figure 7B:
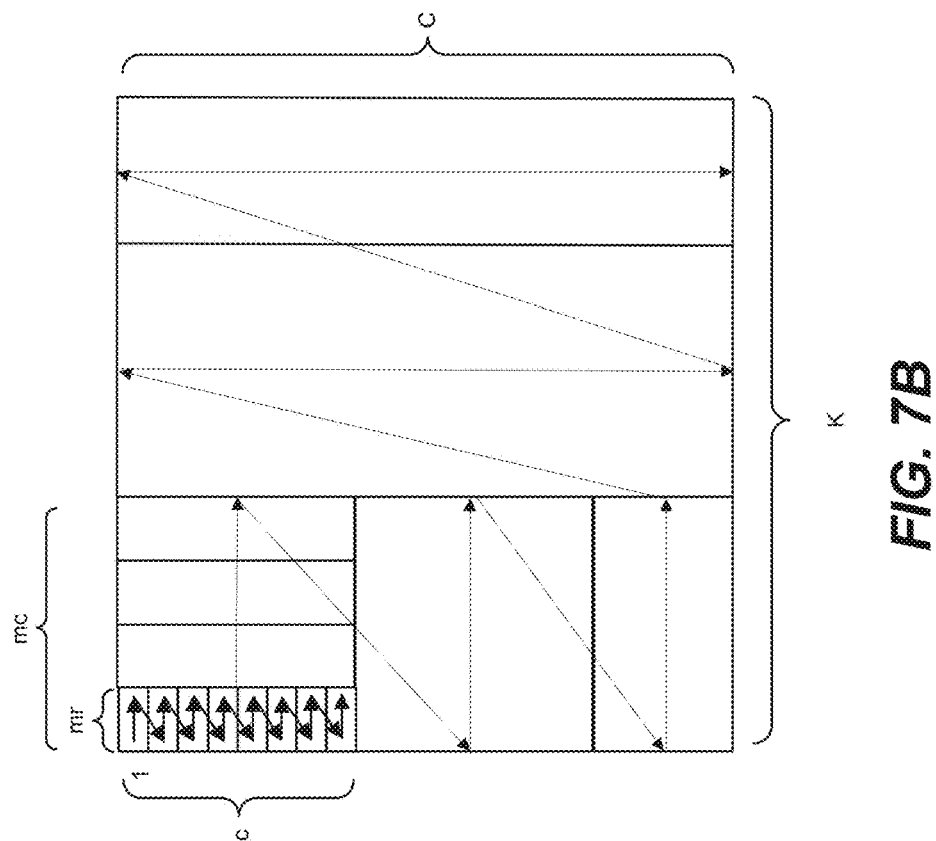
FIGS. 7A and 7B respectively illustrate GEPP/GEBP and a GEPM/GEBP sparse bitmap layouts of a kernel tensor.
Figure 7A:
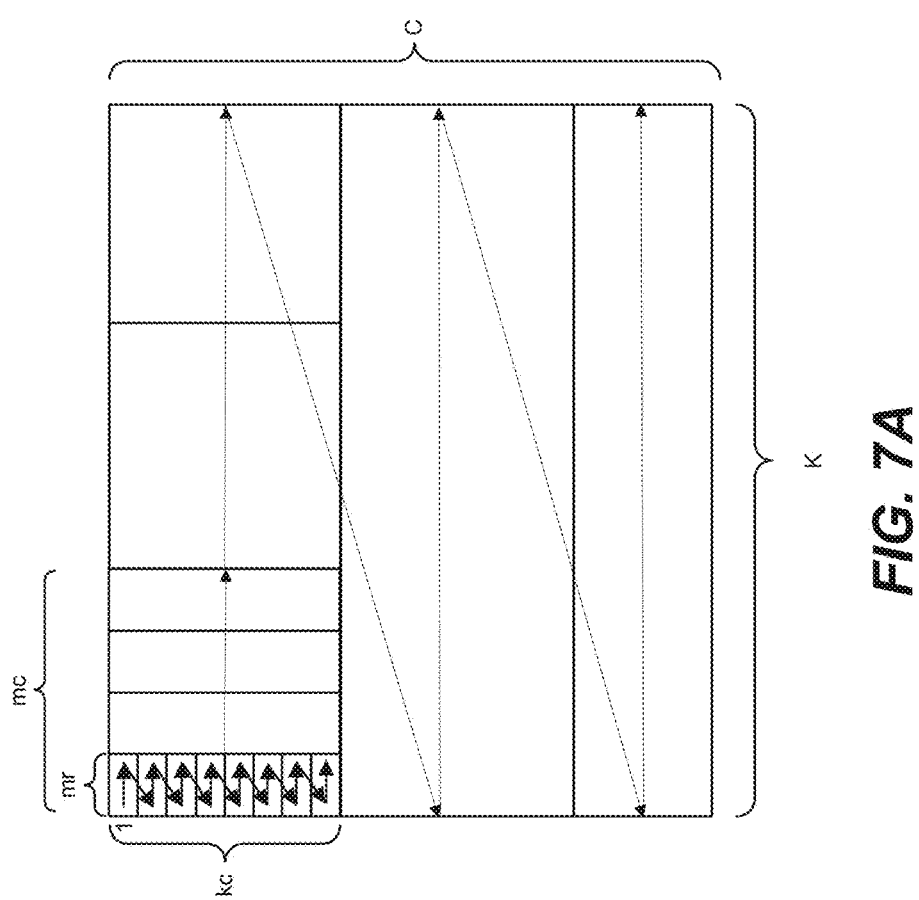

FIGS. 7A and 7B respectively illustrate GEPP/GEBP and a GEPM/GEBP sparse bitmap layouts of a kernel tensor. For the direct convolution method, the convolution filter is reshaped from $F \in \mathbb{R}^{KCRS}$ to $F \in \mathbb{R}^{RSCK}$, where each element of the [R, S] kernel tensor $F_{RS} \in \mathbb{R}^{CK}$ (column-major order or transpose of the lhs matrix of GEBP operation) is a 2D matrix [C, K]. For the Winograd convolution method of the output feature matrix o[2, 2] and kernel f[3, 3], each element of the [16] kernel tensor $F_{RS} \in \mathbb{R}^{CK}$ is a 2D matrix [C, K]. It is appreciated that other Winograd configurations may also be applied. For each $F_{RS}$, a 2D [C, K] sparse bitmap is defined to represent a sparse structure that matches with the underlying GEBP lhs matrix blocking structure.

In particular, FIG. 7A illustrates a GEPP/GEBP sparse bitmap layout of $F_{RS}$, and FIG. 7B illustrates a GEPM/GEBP sparse bitmap layout of $F_{RS}$. For purposes of discussion, the scan orders inside the [kc, mc] blocks are identical, and the scan orders of [kc, mc] blocks are different. For the GEPP/GEBP layout (FIG. 7A), the sparse bitmap layout of $F_{RS}$ is divided to ceil(C, kc) (where 'ceil' is a ceiling operation that converts a floating number to the smallest integer that is bigger than the floating number) row panels, where each of the row panel $F_{kc}$ has a dimension of [kc, K] (except for the last one, if C is not dividable by kc). This row panel is further divided to ceil(K, mc) column panels, where each of the column panels $F_{mc}$ has a dimension of [kc, mc] (except for the last one, if K is not dividable by mc). This column panel is further divided to ceil(mc, mr) column panels, where each of the column panels $F_{mr}$ has a dimension of [kc, mr] (except for the last one, if mc is not dividable by mr). This column panel is further divided to a kc row, where each of the rows $R_{mr}$ has dimension of [1, mr].

For the GEPM/GEBP layout (FIG. 7B), the sparse bitmap layout of $F_{RS}$ is divided to ceil(C, mc) column panels, where each of the column panels $F_{mc}$ has a dimension of [C, mc] (except for the last one, if C is not dividable by mc). This column panel is further divided to ceil(C, kc) row panels, where each of the row panels $F_{kc}$ has a dimension of [kc, mc] (except for the last one, if C is not dividable by kc). This row panel is further divided to ceil(mc, mr) column panels, where each of the column panels $F_{mr}$ has a dimension of [kc, mr] (except for the last one, if mc is not dividable by mr). This column panel is further divided to kc row, where each of this row $R_{mr}$ has dimension of [1, mr].

Parameters C, K for the 2D matrix are treated as syntax elements, and may be stored in syntax table (not shown). In one embodiment, parameters kc, mc and mr are treated as syntax elements, and may also be stored in the syntax table. In another embodiment, parameters kc, mc and mr are pre-defined, and it is not necessary to store them in the syntax table. In another embodiment, some parameters of kc, mc and mr are treated as syntax elements and stored in the syntax table, while other parameters are pre-defined and not stored in the syntax table.

For a matrix multiplication, it is well know that if two rows are swapped in the lhs matrix, the result is a corresponding row swap in the final multiplication output. This row swap (column swap in transposed lhs) operation is adopted to produce more $ZR_{mr}$ ("Z" indicates that all parameters in this block are zero). Fox example, if one $R_{mr}$ is [0, 0, 0, x] and another $R_{mr}$ is [x, 0, x, 0], the fourth columns of these two $R_{mr}$ can be swapped so that the first $R_{mr}$ becomes a $ZR_{mr}$. In one embodiment, if column swapping is not enabled, the above division is done on $F_{RS}$ without column swapping and the parameters in $R_{mr}$ are stored in continuous memory. In another embodiment, if column swapping is enabled and columns are physically swapped, the above division is done on a physically swapped $F_{RS}$, and the parameters in $R_{mr}$ are stored in continuous memory. In still another embodiment, if column swapping is enabled and columns are not physically swapped (they are swapped only by their indices pointer), the above division is done on an index-swapped $F_{RS}$, and whether the parameters in $R_{mr}$ are stored in continuous memory depends on the existence of a column swapping operation.

Sparse Bitmap Layout of Input Feature Map

Figure 7C:
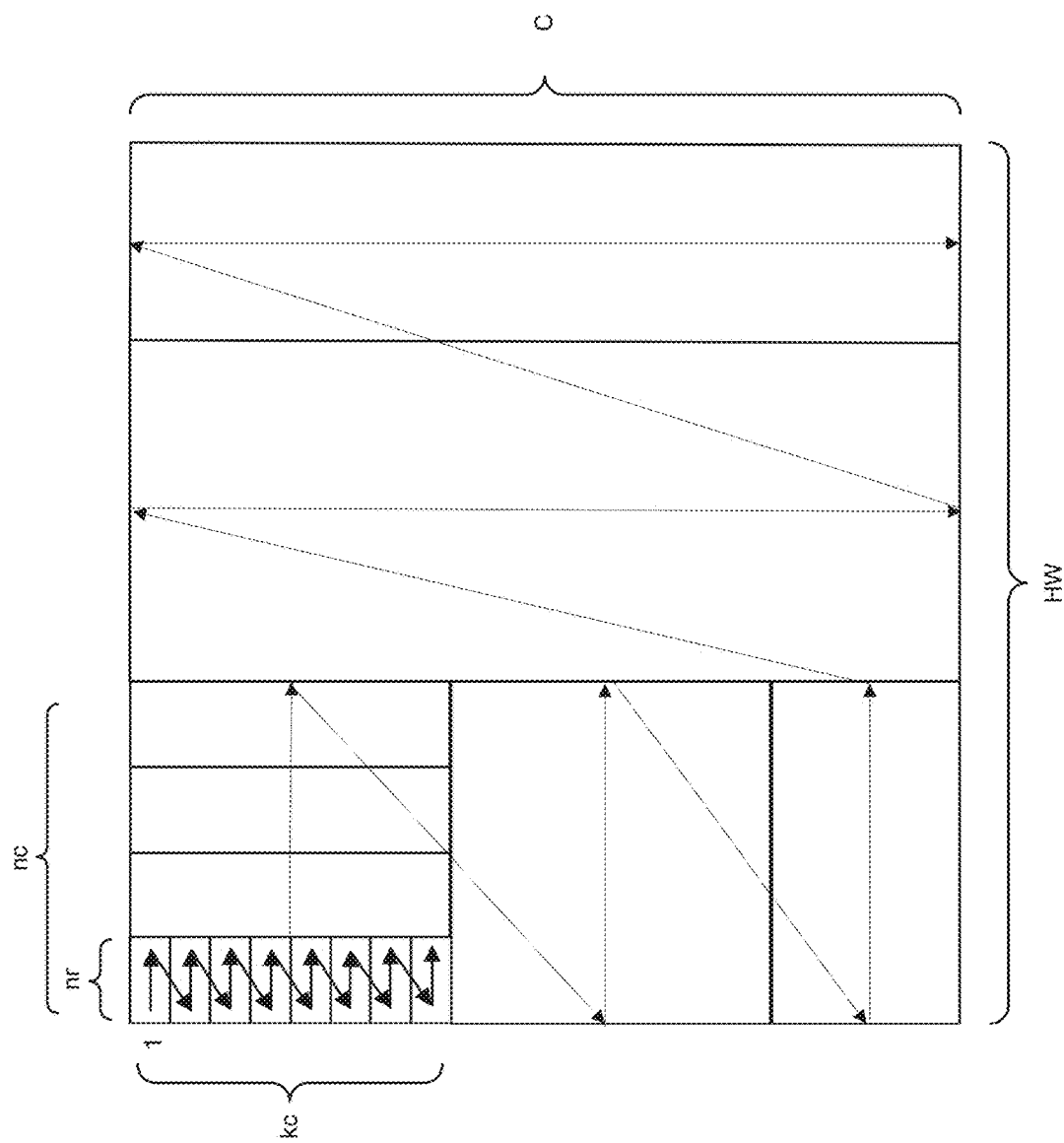
FIG. 7C illustrates a sparse bitmap layout of an input feature map.

FIG. 7C illustrates a sparse bitmap layout of an input feature map. In particular, the sparse bitmap layout is for $D_{RS}$ (rhs matrix in GEBP operation). Applying the direct convolution method, the input feature map (output feature map from previous layer, after the relu operation, the max pooling operation and the im2col process) is reshaped to $D \in \mathbb{R}^{RSCHW}$, such that each element of the [R, S] input feature map tensor $D_{RS} \in \mathbb{R}^{CHW}$ (rhs matrix of GEBP operation) is a 2D matrix [C, H×W]. When applying the Winograd configuration of the output feature matrix o[2, 2] and kernel f[3, 3] method, the input feature map (output feature map from previous layer, after the relu operation, the max pooling operation and the Winograd transformation) is reshaped to $D \in \mathbb{R}^{16CHW}$, such that each element of the [16] input feature map tensor $D_{RS} \in \mathbb{R}^{CHW}$ is a 2D matrix [C, H×W]. It is appreciated that other Winograd configurations may also be applied. For each $D_{RS}$, a 2D [C, H×W] sparse bitmap is defined to represent the sparse structure that matches with the underlying GEBP rhs matrix blocking structure.

In one embodiment, $D_{RS}$ is divided to ceil(H×W, nc) column panels, where each of the column panels $D_{nc}$ has a dimension of [C, nc] (except for the last one, if H×W is not dividable by nc). The column panel is further divided to ceil(C, kc) row panels, such that each of the row panels $D_{kc}$ has a dimension of [kc, nc] (except for the last one, if C is not dividable by kc). This row panel is further divided to ceil(nc, nr) column panels, where each of the column panels $D_{nr}$ has a dimension of [kc, nr] (except for the last one, if nc is not dividable by nr). This column panel is further divided to kc rows, where each of the rows $DR_{nr}$ has dimension of [1, nr].

In one embodiment, the parameters, kc, nc, nr, are treated as syntax elements (and may be stored in the syntax table). In another embodiment, the parameters, kc, nc, nr, are pre-defined such that they are not stored in syntax table. For a matrix multiplication, it is well known that if two columns are swapped in the rhs matrix, the result is a corresponding column swap in the final multiplication output. This column swap (row swap in transposed rhs) operation is adopted to produce more $ZDR_{nr}$ ("Z" indicates that all parameters in this block are zero). For example, if one $DR_{nr}$ is [0, 0, 0, x] and another $DR_{nr}$ is [x, 0, x, 0], the fourth columns of the two $DR_{nr}$ can be swapped so that the first $DR_{nr}$ becomes a $ZDR_{nr}$. In one embodiment, if column swapping is not enabled, the above division is done on $D_{RS}$ without column swapping, and the parameters in $DR_{nr}$ are stored in continuous memory. In another embodiment, if column swapping is enabled, and columns are physically swapped, the above division is performed on physically swapped $D_{RS}$, and the parameters in $DR_{nr}$ are stored in continuous memory. In still another embodiment, if column swapping is enabled, and columns are not physically swapped (they are swapped only by their indices pointer), the above division is performed on index-swapped $D_{RS}$, and whether the parameters in $DR_{nr}$ are stored in the continuous memory depends on the existence of column swapping operation.

Sparse Network Training and Retraining

As discussed briefly above, a DNN can be newly trained or retrained from a pre-trained filter tensor. To generate a sparse network, a sparse operation is performed during the training/retraining process. For an existing sparse operation, each weight parameter is compared with a threshold. The parameter is set to zero if its absolute value is smaller than the threshold, and the parameter is set to its original value if its absolute value is not smaller than the threshold. A mask matrix (in which each element of this mask indicates if the corresponding parameter is zero) is generated so that the gradient update of a given weight parameter is stopped if the corresponding mask bit is zero. In this sparse operation method, the weight parameter stays zero once its absolute value is smaller than the threshold, regardless of the result of any future gradient update.

In one embodiment, a modified sparse operation is adopted in which a parameter is treated as zero when the absolute values of the parameters in row $R_{mr}$ are smaller than the threshold, such that the mask bits of the parameters in row $R_{mr}$ are treated as zeroes so that the gradient updates are stopped for the parameters in row $R_{mr}$. For example, given $R_{mr}$ [1, 2, 3, 4] and threshold value 5, $R_{mr}$ is treated as [0, 0, 0, 0] and mask bits are set to [0, 0, 0, 0]. If the threshold value is 3, $R_{mr}$ keeps its original value and mask bits are set to [1, 1, 1, 1].

As noted above, columns can be swapped in order to produce more $ZR_{mr}$. If a parameter, whose absolute value is not smaller than the threshold, is swapped into a $ZR_{mr}$ row, this row becomes a normal $R_{mr}$ row, $R_{mr}$ resumes its original value and the mask bits of this $R_{mr}$ row are set to indicate that the $R_{mr}$ will participate in a future gradient update. If the parameter, whose absolute value is smaller than the threshold, is swapped into an $R_{mr}$ row, this row becomes a $ZR_{mr}$ row, $R_{mr}$ is treated as zero, and the mask bits of this $ZR_{mr}$ row are set to zeroes to indicate that this $ZR_{mr}$ will not participate in future gradient updates.

In another embodiment, a parameter is treated as zero when the absolute values of the parameters in row $R_{mr}$ are smaller than the threshold, and the mask bits of the parameters in row $R_{mr}$ are treated as zeroes. For example, given $R_{mr}$ [1, 2, 3, 4] and a threshold value 5, $R_{mr}$ is treated as [0, 0, 0, 0] and mask bits are set to [0, 0, 0, 0]. If the threshold value is 3, $R_{mr}$ keeps its original value and mask bits are set to [1, 1, 1, 1].

Similar to the above embodiment, columns may be swapped in order to produce more $ZR_{mr}$. If a parameter, whose absolute value is not smaller than the threshold, is swapped into a $ZR_{mr}$ row, the row becomes a normal $R_{mr}$ row, $R_{mr}$ resumes its original value and the mask bits of this $R_{mr}$ row are set to ones. If the parameter, whose absolute value is smaller than the threshold, is swapped into an $R_{mr}$ row, the row becomes a $ZR_{mr}$ row, $R_{mr}$ is treated as zero, and the mask bits of this $ZR_{mr}$ row are set to zeroes.

In one embodiment, the non-zero parameters are represented by its original values. In another embodiment, a k-means method is applied to $F_{RS}$ or Winograd $F_{RS}$ filter tensor to group non-zero parameters to k-means indices. In another embodiment, a k-means method is applied to $F_{RS}$ or Winograd $F_{RS}$ filter tensor to group some non-zero parameters to k-means indices, and keep the original value for the other non-zero parameters. In still another embodiment, low-rank factorization can be used to represent the modified $F_{RS}$ or modified Winograd $F_{RS}$ filter tensor. In one embodiment, the parameters of two low-rank matrixes are represented by its original values. In another embodiment, a k-means method is applied to two low-rank matrixes to group the parameters to k-means indices. In another embodiment, a k-means method is applied to two low-rank matrixes to group some non-zero parameters to k-means indices, and keep the original value for other non-zero parameters.

Accordingly, the sparse operation includes the steps of setting a mask matrix to all ones, evaluating RDSPO based compression, calculating if the absolute value of elements is smaller than the threshold, performing column swap to generate more $ZR_{mr}$ based on RDSPO result, setting parameter values in $ZR_{mr}$ to zero, setting parameter values in $R_{mr}$ to the values defined by underlying embodiments, setting parameter values in two low-rank matrixes to the values defined by underlying embodiments if low-rank factorization is used, updating mask bits based on underlying embodiments, performing a DNN training operation and repeating the steps (except step 1) until training has completed.

In one embodiment, the original value of output feature map (input feature map for next layer) is used during network retraining. In another embodiment, the sparse, quantized and compressed value of output feature map (input feature map for next layer) is used during network retraining.

Sparse Filter Tensor Compression

A rate-distortion-speed-power-optimization RDSPO (cost function) is defined in order to improve compression quality, inference speed and power consumption. The optimization that leads to the smallest RDSPO is treated as the optimized RDSPO, where RDSPO is defined by the following equation:

$$\text{RDSPO}=D+\lambda R+\mu S+\eta P \qquad (1).$$

The rate is the compressed bit count of the kernel tensor, including an array of swapped column indices (if column swapping is enabled), a layered sparse bitmap, a non-zero parameters of $F_{RS}$ or Winograd $F_{RS}$ represented by their original values or k-means values (if low-rank factorization is not used), and parameters represented by their original values or k-means values (if low-rank factorization is used).

Distortion may be measured using various techniques. In one embodiment, distortion is measured by the difference between network accuracy performance when utilizing the original weight value and network performance when utilizing the reconstructed weight value. In another embodiment, distortion is measured by the difference between the output feature map in the target layer when utilizing the value of original weight and the value of original input feature map and the output feature map in the same layer when utilizing the value of reconstructed weight and the value of original input feature map. In still another embodiment, distortion is measured by the difference between the output feature map in the target layer when utilizing the value of the original weight and the value of the original input feature map and the output feature map in the same layer when utilizing the value of the reconstructed weight and the value of the reconstructed input feature map. In yet one other embodiment, distortion is measured by the difference between the original parameter value and the reconstructed parameter value. In any one of the embodiments, L1 (lease absolute deviation) and/or L2 (least squares) normalization can be applied to evaluate the distortion.

In one embodiment, when inference speed and power consumption are not an issue, the rate-distortion (RD) or rate-distortion-optimization (RDO) equal to $D+\lambda R$ may be utilized. Otherwise, an S factor is defined to indicate the inference speed, and a P factor is defined to indicate the power consumption. When using the S and P factors, both inference speed and power consumption are related to the number of MAC operations and the number of memory accesses in the GEBP process. However, to simplify the calculation, and in one example embodiment, inference speed S is represented by the number of MAC operations in the GEBP process, and power consumption P is represented by the number of memory accesses in the GEBP process. Here, S is defined as the number of $NZR_{mr}$ rows, a negative of the number of $ZR_{mr}$ rows, or any other definition that represents the number of MAC operations. P is defined as the number of memory accesses. Using this information, a memory model is built to calculate the power consumption using the number and pattern of memory access for each memory type (DRAM, SRAM, etc. . . . ).

In one embodiment, based on the property of the matrix multiplication, the MAC operation can be skipped if either $ZR_{mr}$ is found in the lhs matrix or $ZDR_{nr}$ is found in the rhs matrix. Thus, if the layered sparse bitmap of the input feature map is also utilized in the process, it can be combined with the layered sparse bitmap of the filter tensor to calculate the S and P factors.

In order to obtain an optimal RDSPO, increase inference speed and decrease power consumption, an array of swapped column indices and layered sparse bitmap are encoded together with two low-rank matrixes. In this regard, they are used to direct the low-rank factorization method to generate only non-zero coefficients of the sparse matrix, and direct underlying GEBP to skip operating on all-zero blocks in the lhs matrix of GEBP operation.

Array of Swapped Column Indices

In one embodiment, a column_swap_enable flag is defined to indicate whether column swapping is enabled. Since the column swapping operation changes the compression rate and inference speed (not distortion), in addition to the column swapping operation during network training, the column indices can be further swapped after the training is completed so that the best rate-speed-power-optimization (RSPO=R+µS+ηP) is achieved. The swapped column indices may be stored, for example, in a column_swap_array[N], where N=K (the number of output features). In one embodiment, a value j in entry i of the column_swap_array indicates that column i is swapped to column j. The column swapping operation can also be constrained (N<K) so that the swapping operation can only be performed within every N column.

To indicate if the column has been swapped, a column_swap_bit_array can be defined, according the equation (2) below. The column swap bit array can also be coded using deferent methods, as illustrated below.

$$\text{column\_swap\_bit\_array}[i]=(i \neq \text{column\_swap\_array}[i]) \qquad (2).$$

In one embodiment, swapping operations are chained together, if entry $i_n$ of column_swap_array is nth column in the swap chain (whose entry value is $j_n$), where $0 \leq n < N$, swap chain rule ensures that the last entry value in the swap chain equals the first entry index in the swap chain ($j_{N-1}=i_0$). Furthermore, column_swap_array can be reordered so that the elements in each swap chain are grouped together, as illustrated in Tables II and IV below.

TABLE III

Entry index, entry value, and bit_array of column_swap_array

| Original index | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| Original value | ~~0~~ | 3 | 4 | 1 | 2 | 7 | ~~6~~ | 11 | ~~8~~ | ~~9~~ | ~~10~~ | 5 | 14 | ~~13~~ | 12 | ~~15~~ |
| Bit_array | 0 | 1 | 1 | 1 | 1 | 1 | 0 | 1 | 0 | 0 | 0 | 1 | 1 | 0 | 1 | 0 |

TABLE IV

Inferred entry index, entry value, and bit_array for reordered column_swap_array

| Inferred index | 0 | 1 | 3 | 2 | 4 | 5 | 7 | 11 | 6 | 8 | 9 | 10 | 12 | 14 | 13 | 15 |
|---|---|---|---|---|---|---|---|---|---|---|---|---|---|---|---|---|
| Reordered value | ~~0~~ | 3 | ~~1~~ | 4 | ~~2~~ | 7 | 11 | ~~5~~ | ~~6~~ | ~~8~~ | ~~9~~ | ~~10~~ | 14 | ~~12~~ | ~~13~~ | ~~15~~ |
| Reordered bit_array | 0 | 1 | 1 | 1 | 1 | 1 | 1 | 1 | 0 | 0 | 0 | 0 | 1 | 1 | 0 | 0 |

In the tables above, the following operations may be performed:
1) swap_run: a run of 1 s in column_swap_bit_array;
2) non_swap_run: a run of 0 s in column_swap_bit_array;
3) g: entry values in column_swap_bit_array, whose corresponding column_swap_bit_array[ ] are 1 s;
4) gi: entry values in column_swap_bit_array, whose corresponding column_swap_bit_array[ ] are 0 s;
5) swap_value can be encoded after all column_swap_bit_array is encoded, it can also be encoded immediately after swap_run is encoded. Coding of non_swap_value is skipped as they can be inferred.

According to Table III, encoding of column_swap_array is performed on the original column_swap_array without reordering. If the last run (a single element run) is "1," the run (a single element of non_swap_run) and its non_swap_value are skipped as they can be inferred. In one embodiment, the column_swap_bit_array is encoded by a Context-based Adaptive Binary Arithmetic Coding (CABAC) engine one bit at a time. In another embodiment, the column_swap_bit_array is encoded by a modified run-length coding. In the embodiment, column_swap_bit_array[0] is encoded first (the rest of run_values are skipped as they can be inferred), followed by the sequence of runs (swap_run-1 and non_swap_run-1).

According to Table IV, encoding of the column_swap_array is performed on a reordered column_swap_array, where a swap_run indicates the total number of swapped columns in one swap chain (multiple swap_runs for multiple back-to-back swap chains). If the column_swap_bit_array is encoded one bit at a time, a zero is inserted after the swap_run of each swap chain. If the last run (a single element run) is "1," the run (always a single element of non_swap_run) and its non_swap_value are skipped as they can be inferred. Multiple column_swap_bit_array element skipping techniques and column_swap_array element skipping techniques may be used. For example, for a column_swap_bit_array element skipping technique, coding of bits immediately after a non_swap_run is skipped since it can be inferred (swap_run). If the last run (a single element run) is "1," the run is skipped since it can be inferred (a single element of non_swap_run). For a column_swap_array element skipping technique, coding of the non_swap_value is skipped since it can be inferred, and coding of the last swap_value in a swap chain is skipped since it is equal to the first inferred entry index in the swap chain.

In one embodiment, the column_swap_bit_array is encoded by the CABAC engine one bit at a time. A zero is inserted after a swap_run of each swap chain. The above-mentioned element skipping techniques are used in the coding of the reordered column_swap_bit_array and column_swap_array. In another embodiment, the column_swap_bit_array is encoded by run-length coding. The run-length coding encodes all pairs of [bits (0 or 1), runs (non_swap_run-1 or swap_run-1)]. Additionally, the above-mentioned element skipping techniques are used in the coding of a reordered column_swap_bit_array and column_swap_array. In one embodiment, a different encoding method can be used to encode a column_swap_array without encoding the column_swap_bit_array. For example, for each swap chain, the swap_run of the swap chain can be encoded, followed by the first inferred index, and the sequence of swap_values in the swap chain (coding of last swap_value in a swap chain can be skipped). In another embodiment, for each swap chain, the first inferred index is encoded, followed by the sequence of swap_values in the swap chain.

Layered Sparse Bitmap

Figure 8A:
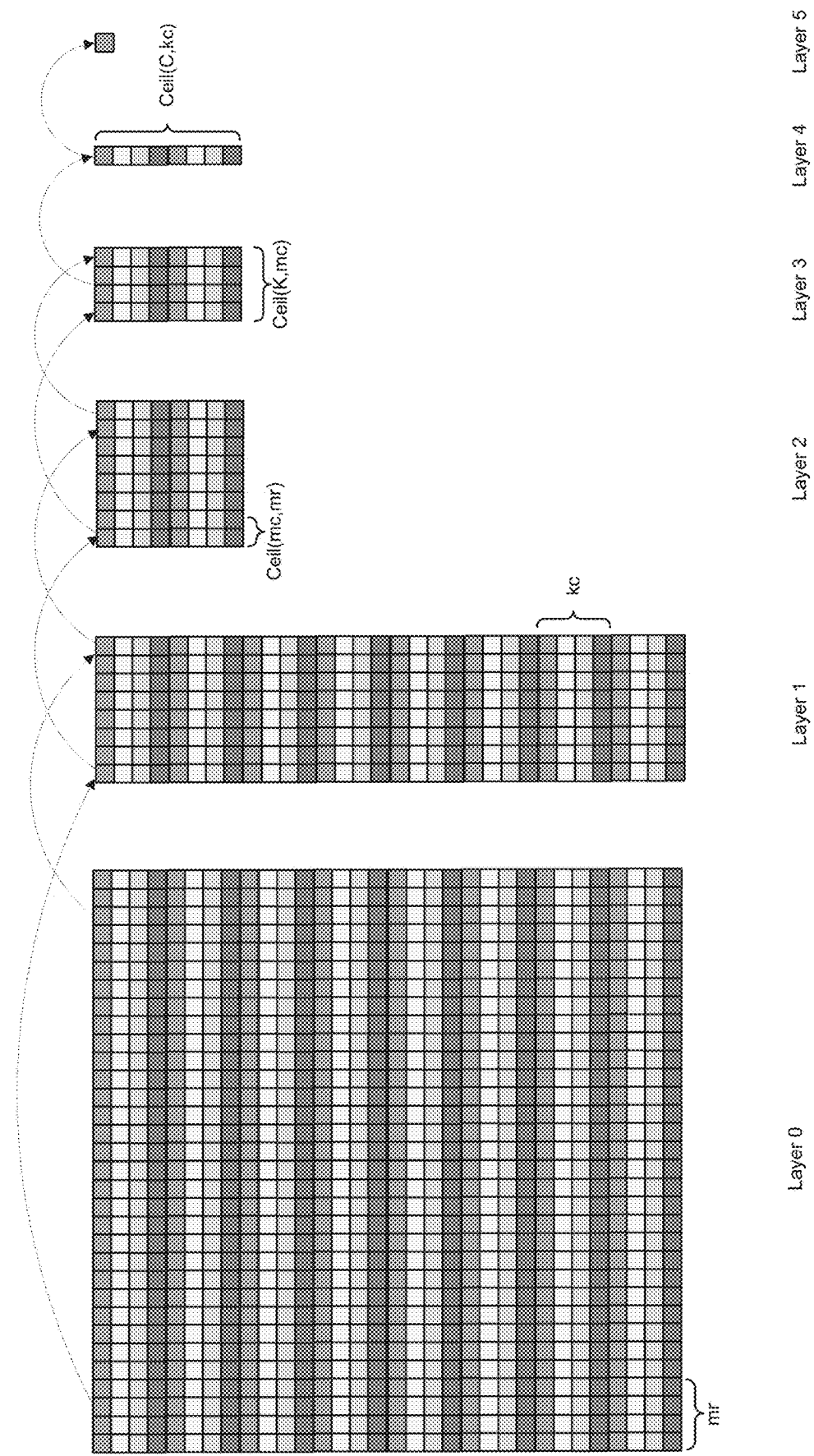
FIGS. 8A-8C illustrate examples of a layered sparse bitmap.
Figure 8B:
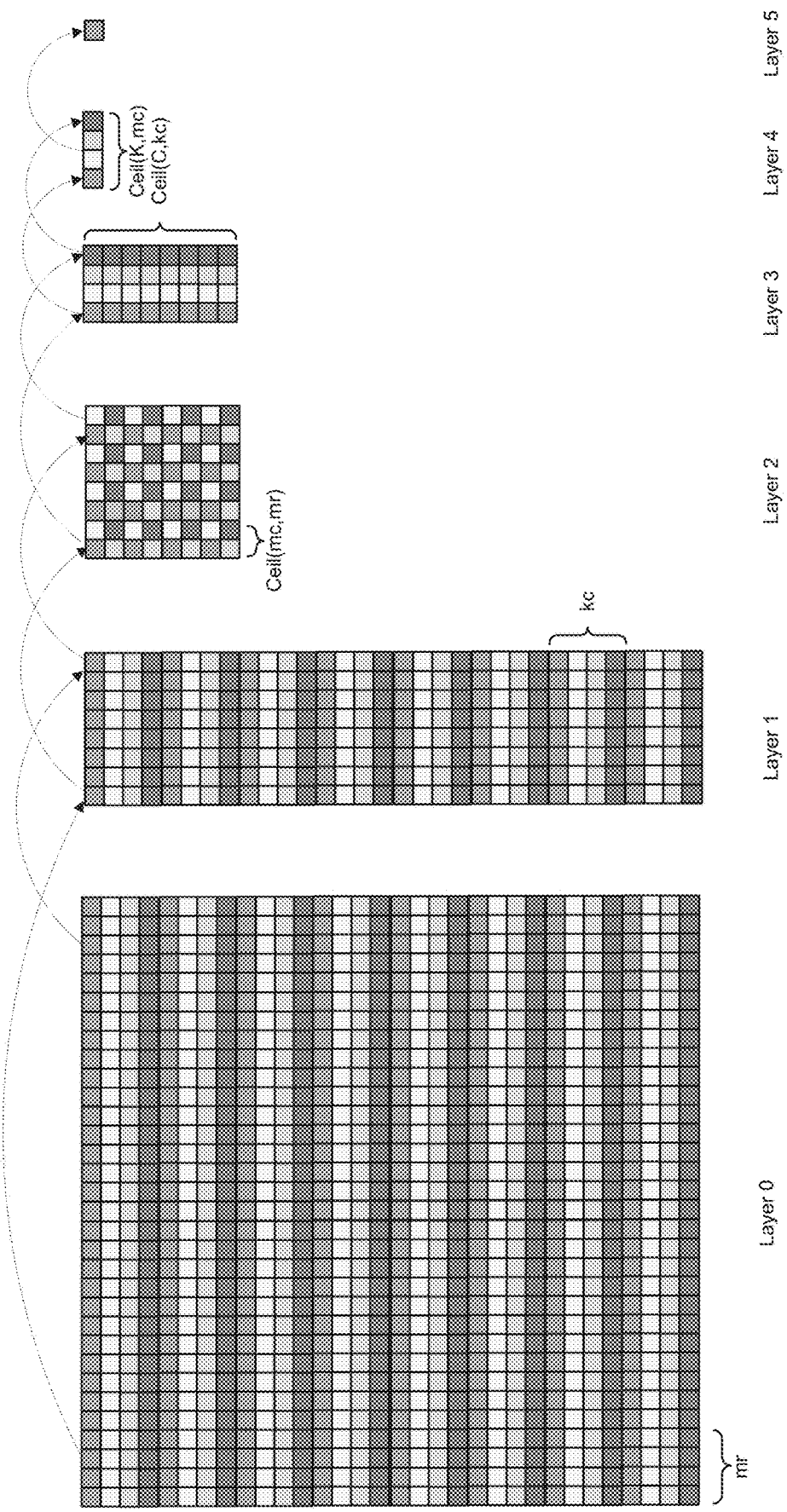
Figure 8C:
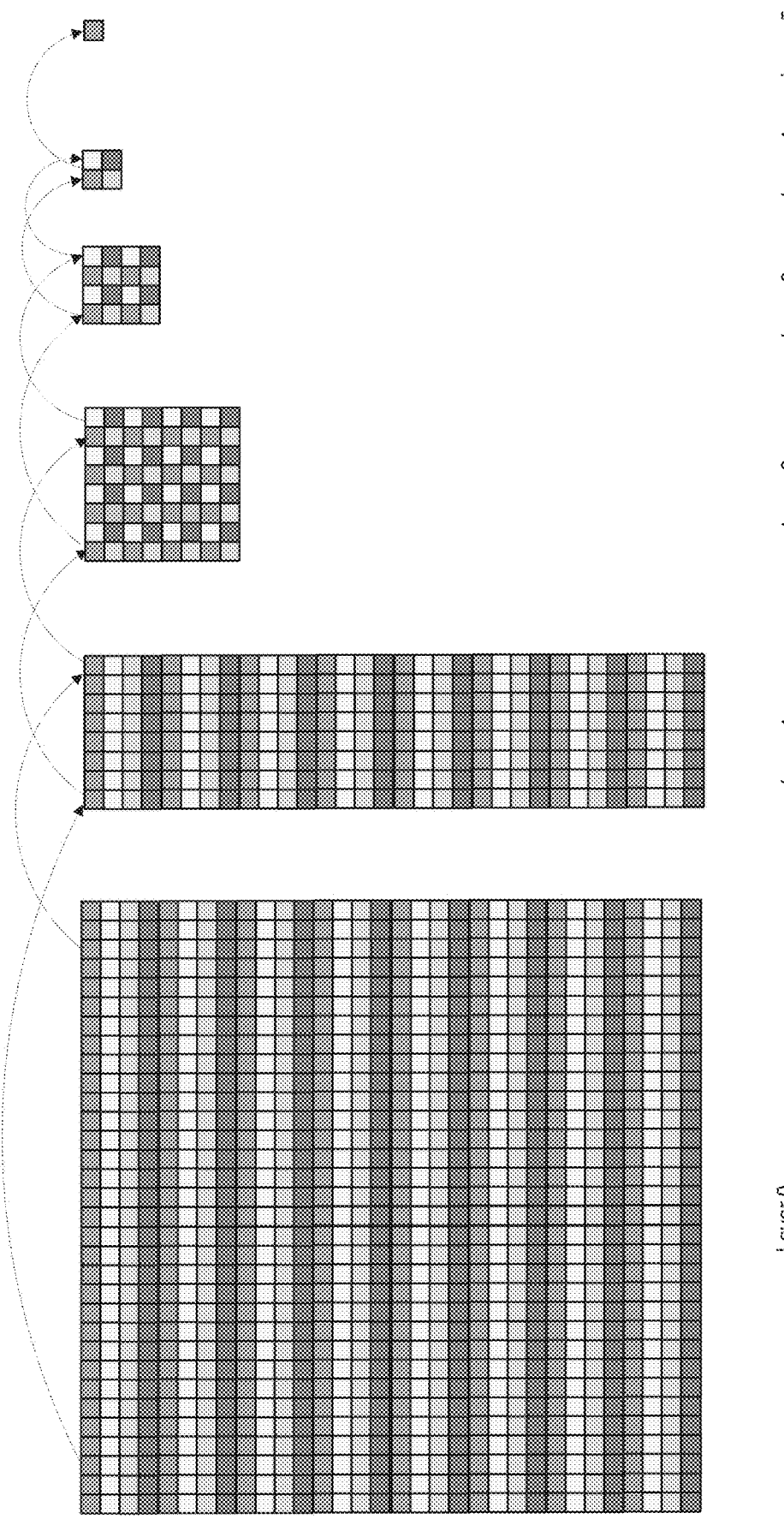

FIGS. 8A-8C illustrate examples of a layered sparse bitmap. For each $F_{RS}$, a 2D [C, K] sparse bitmap is defined to represent a sparse structure that matches with the underlying GEPP/GEBP or GEPM/GEBP lhs matrix blocking structure, discussed above. The GEPP/GEBP or GEPM/GEBP lhs matrix configuration variables kc, mc, mr (or rhs matrix configuration variables kc, nc, nr) are typically determined by the size of an on-chip single/multiple cache and register file of the underlying device (such as a desktop CPU or embedded CPU), or by the size of the on-chip memory for devices without cache and register file (such as FPGA). They can also be set arbitrarily (such as kc=4, mc=4, nc=4, etc. . . . ).

In one embodiment, the lhs matrix configuration variables kc, mc, mr are treated as syntax elements and stored, for example, in a syntax table. In another embodiment, the lhs matrix configuration variables kc, mc, mr are pre-defined so that they are not stored in the syntax table. In still another embodiment, some of the lhs matrix configuration variables kc, mc, mr are treated as syntax elements and stored in the syntax table, while others are pre-defined so that they are not stored in syntax table.

In one embodiment, the rhs matrix configuration variables kc, nc, nr are treated as syntax elements and stored in syntax table. In another embodiment, rhs matrix configuration variables kc, nc, nr are pre-defined so that they are not stored in syntax table. In another embodiment, some rhs matrix configuration variables kc, nc, nr are treated as syntax elements and stored in syntax table, others are pre-defined so that they are not stored in syntax table.

In one other embodiment, the sparse bitmap is directly encoded using a single layer representation. In this case, the scan order can be row-wise raster order, column-wise raster order, zigzag order, an order that follows GEPP/GEBP or GEPM/GEBP matrix blocking structure, or any other known order. If the last run (a single element run) is "1," the run is skipped since it can be inferred (run equals to 1, run_value equals to 1-previous run_value). In one embodiment, the sparse bitmap is encoded by a CABAC engine one bit at a time. In another embodiment, the sparse bitmap is encoded by a modified run-length coding. The sparse bitmap[0] is encoded first (the rest of run_values are skipped as they can be inferred), followed by the sequence of runs (run-1).

With reference to FIG. 8A, the sparse bitmap has a layered structure that matches with the underlying GEPP/GEBP lhs matrix blocking structure, described above. In particular, the layered sparse bitmap layout uses mr, kc and mc configuration. Layer 5 is the root, and it represents ceil(C, kc) row panel $B_{kc}$, each node in layer 4 represents ceil(K, mc) column panel $B_{mc}$, each node in layer 3 represents ceil(mc, mr) column panel Bmr, each node in layer 2 represents a kc row $R_{mr}$, each node in layer 1 represents mr column sparse bitmap elements, and layer 0 is the original sparse bitmap.

Turning to FIG. 8B, the sparse bitmap has a layered structure that matches with underlying GEPM/GEBP lhs matrix blocking structure, as described above. In particular, the layered sparse bitmap layout also uses mr, kc and mc configuration. In this case, layer 5 is the root, and it represents ceil(K, mc) column panel $B_{mc}$, each node in layer 4 represents ceil(C, kc) row panel $B_{kc}$, each node in layer 3 represents ceil(mc, mr) column panel $B_{mr}$, each node in layer 2 represents kc row $R_{mr}$, each node in layer 1 represents mr column sparse bitmap elements, and layer 0 is the original sparse bitmap.

In FIG. 8C, the sparse bitmap has a layered structure that is a quad-tree block structure. In this embodiment, layer 0 is the original sparse bitmap, each node in layer 1 represents mr column sparse bitmap elements, each node in layer 2 represents kc row $R_{mr}$, each node in the following layer represents a 2×2 elements in previous layer.

In still other embodiments, the sparse bitmap may have other arbitrarily defined layered structures to efficiently represent the original sparse bitmap. These layers are encoded using a depth-wise binary tree scan order, starting from the root node. For each node, a node value zero indicates that the value of its child nodes are all zeroes so that encoding of the child nodes is skipped. A node value equal to one indicates that the value of at least one of the child node is one so that its child nodes are encoded one by one. If all child nodes (except for the last child node) have a value of zero, encoding of the last child node is skipped as it can be inferred (as one).

In one embodiment, the layered structure is encoded by a CABAC engine one bit at a time. If a last run (a single element run) is "1," the run is skipped as it can be inferred (run equals to 1, run_value equals to 1-previous run_value). In another embodiment, the layered structure is encoded by a modified run-length coding. The first run_value is encoded first (the rest of run_values are skipped as they can be inferred), followed by the sequence of runs (run-1). If last run (a single element run) is "1," the run is skipped as it can be inferred (run equals to 1, run_value equals to 1-previous run_value). Due to the use of the depth-wise binary tree scan order, if the run of 1 s is more than 1, the child nodes are sequentially coded immediately after the run of 1 s. In another embodiment, the layered structure is encoded by a run-length coding. Run-length coding encodes all pairs of [0, runs (run-1)] or [1, 1]. A run of 1 is always set to 1 to accommodate the depth-wise binary tree scan order. In another embodiment, different scan orders and encoding methods as well-known can be used to encode the layered structure.

Coefficients Quantization and k-Means Clustering

Quantization can be applied to coefficients in a DNN, neural network represented by low-rank factorization and to non-zero coefficients in a sparse neural network. These coefficients can be divided into smaller groups (e.g., GOC) with an arbitrarily defined size, grouped by the above sparse bitmap blocking structure, or quantized without any grouping. In one embodiment, coefficients can be quantized using a method similar to the quantization method adopted by Tensorflow Lite. Tensorflow Lite utilizes an 8 bit quantization method that takes a maximum (max) and a minimum (min) value from one layer and quantizes the parameter using a quantization step (max-min)/256. In one other embodiment, coefficients can be quantized using a method similar to the quantization method adopted by any video compression standard.

For example, a quantization method in the HEVC standard is illustrated below. In the HEVC standard, QP is defined as a quantization step, TransCoeff is a 19 bit signed DCT output, ClipTransCoeffLevel is a 16 bit signed value (after quantization and clip), where {clipMinimum, clipMaximum}={−(1<<15), (1<<15)−1}, {qp_per, qp_rem}={QP/6, QP % 6}, quantScales[ ]={26214, 23302, 20560, 18396, 16384, 14564}, and snf scale=quantScales[qp_rem].

| Block Size | iQBits | iAdd |
| --- | --- | --- |
| 4 × 4 | 19 + qp_per | (Intra ? 171:85) << (10 + qp_per) |
| 8 × 8 | 18 + qp_per | (Intra ? 171:85) << (9 + qp_per) |
| 16 × 16 | 17 + qp_per | (Intra ? 171:85) << (8 + qp_per) |
| 32 × 32 | 16 + qp_per | (Intra ? 171:85) << (7 + qp_per) |

TransCoeffLevel=sign(TransCoeff)*
((abs(TransCoeff)*scale+iAdd)>>iQBits)

ClipTransCoeffLevel=Clip3(clipMinimum,clipMaximum,TransCoeffLevel)

In one embodiment, the original coefficients (without quantization) are encoded using a progressive coding method.

In another embodiment, the quantized coefficients are encoded using a progressive coding method.

In still another embodiment, the k-means method is applied to the original coefficients so that all of original coefficients are mapped to K k-means centroids. K k-means centroids are encoded using a progressive coding method, while the original coefficients represented by k-means indices are encoded losslessly.

In yet another embodiment, the k-means method is applied to the quantized coefficients so that all of the quantized coefficients are mapped to K k-means centroids. K k-means centroids are encoded using progressive coding method, while the quantized coefficients represented by k-means indices are encoded losslessly.

In one other embodiment, the k-means method is applied to the coefficients prior to quantization, so that all of coefficients are mapped to K k-means centroids. The K k-means centroids are quantized and encoded using a progressive coding method, while the coefficients represented by k-means indices are encoded losslessly.

In another embodiment, the k-means method is applied to the quantized coefficients but not all of quantized coefficients are mapped to K k-means centroids. The index K is assigned to the escaped coefficients. K k-means centroids (and the escaped coefficients) are encoded using a progressive coding method, while the quantized coefficients represented by k-means indices (including index K who indicates escaped coefficients) are encoded losslessly.

In one further embodiment, the k-means method is applied to the coefficients prior to quantization, but not all of coefficients are mapped to K k-means centroids. The index K is assigned to the escaped coefficients. K k-means centroids (and the escaped coefficients) are quantized and encoded using a progressive coding method, while the coefficients represented by k-means indices (including index K who indicates escaped coefficients) are encoded losslessly.

K-Means Centroids (Palette) Sharing

The K-means method may be applied to a GOC so that some or all of quantized coefficients are mapped to K k-means centroids (Palette). It is well-established that some or all of the palette entries may be duplicative among multiple GOCs in one or more convolution layers. In this case, the palette entries are shared among multiple GOCs.

In one embodiment, the palette predictor concept from the HEVC SCC standard is applied. A palette predictor with a predefined size (P) is used to store the k-means centroids generated from previous GOC. In one embodiment, the defined or predefined size is a maximum allowable size. After performing the k-means method to the current GOC, the newly generated centroid is compared with the previously generated centroids in a palette predictor. The newly generated centroid can be replaced by previously generated centroids in the palette predictor if a better RD is obtained by using such centroids in palette predictor. Here, RD is defined as RD=D+λR, where R=bits of encoding centroids+bits of encoding coefficients represented by k-means indices, and D=distortion between original coefficients and reconstructed coefficients.

After the newly generated centroids are processed, they are either represented by its original value, or represented by an index to the palette predictor. The number and index location of the inferred centroids is encoded first, followed by the number of the signaled centroids, and then the signaled centroids.

The palette predictor is updated by removing the duplicative entries first, followed by inserting the new centroids to the beginning of the palette predictor. The palette predictor keeps the P centroids at the beginning of the list if the total number of centroids (or "special value") is more than predefined size P. In one embodiment, the palette predictor is initialized once and never reset. In another embodiment, the palette predictor is reset at the beginning of each $F_{RS}$. In still another embodiment, the palette predictor is reset at the beginning of the filter tensor F of a given convolution layer. In yet another embodiment, the palette predictor is reset at the beginning of filter tensor F of all convolution layers.

Progressive Coding

The bit-plan based progressive coding method in the JPEG2000 standard ensures the best RD performance when an additional layer is received at the decoder (decompression) side. However, this method encodes coefficients one bit at a time, which results in a slow decoding speed. Nevertheless, a simplified layer based progressive coding may be adopted to solve the speed issue. The bit-plan and layer concept are borrowed from JPEG2000 standard, however, after the layer-RDO calculation is completed and the number of bit-plans (NBP) that need to be included in a given layer is decided, the chunk (NBP bits) from the coefficient is encoded as one integer instead of NBP individual bits. In one embodiment, the layer-RDO is performed on coefficients in each GOC. In another embodiment, the layer-RDO is performed on coefficients in each $F_{RS}$. In still another embodiment, the layer-RDO is performed on coefficients in filter tensor F of a given convolution layer. In yet another embodiment, the layer-RDO is performed on coefficients in filter tensor F of all convolution layers. In one further embodiment, the layer-RDO is performed on coefficients in filter tensor F of all convolution layers and all fully connected layers.

When the GOC is defined by the above-noted sparse bitmap blocking structure, each GOC in the first layer is coded immediately after the coding of a corresponding sparse bitmap block so that the GEBP operation is not paused. The GOC in other layers are then placed after the GOC in the first layer is encoded. Since coefficients in all convolution layers and fully connected layers are used in order for the neural network to function, the decoder receives at least the first layer of coefficients of all convolution layers and fully connected layers.

Sparse Feature Map Compression

For the direct convolution method, the output feature map (input feature map for next layer) is generated after a relu layer, a max pooling layer (if implemented), and an im2col operation. For the Winograd based convolution method, the output feature map (input feature map for next layer) is generated after a relu layer, a max pooling layer (if implemented), and a Winograd transformation.

Thus, according the above embodiments, one or more of the following methods may be used in a sparse filter tensor compression to compress the sparse output feature map: RDSPO, an array of swapped column indices, a layered sparse bitmap, coefficients quantization and k-means clustering (clustering algorithm), and K-means centroids (Palette) sharing. Based on the property of matrix multiplication, the MAC operation can be skipped if either $ZR_{mr}$ is found in the lhs matrix or the $ZDR_{nr}$ is found in the rhs matrix. Layered sparse bitmap of the input feature map can be combined with the layered sparse bitmap of the filter tensor to calculate S and P factors.

Layered Sparse Bitmap Guided GEBP Operation

In one embodiment, the above described layered sparse bitmaps from the filter tensor is used as additional input to the GEBP so that it skips the multiplication operation for $ZR_{mr}$, $ZF_{mr}$, $ZF_{mc}$, $ZF_{kc}$ and $ZF_{RS}$, where "Z" indicates that all parameters in the block are zero. In another embodiment, the above described layered sparse bitmaps from both the filter tensor and the input feature map are used as additional inputs to GEBP so that it skips multiplication operation for $ZR_{mr}$, $ZF_{mr}$, $ZF_{mc}$, $ZF_{kc}$, $ZF_{RS}$, and $ZDR_{nr}$, $ZD_{nr}$, $ZD_{kc}$, $ZD_{nc}$ and $ZD_{RS}$, where "Z" indicates that all parameters in the block are zero.

Model Layer Modification for Inference

For the direct convolution method, a customized layer is created using a compressed sparse input feature map and its layered sparse bitmap as input. The convolution operation is calculated along with a relu operation, max pooling operation (if implemented), and an im2col operation and generates uncompressed output. The final compressed sparse output feature map and its layered sparse bitmap are generated after the sparse, quantization, and compression process. For the Winograd based convolution method, a customized layer is created using the compressed sparse input feature map and its layered sparse bitmap as input. The convolution operation is calculated along with a relu operation, max pooling operation (if implemented), a Winograd transformation and an uncompressed output is generated. The final compressed sparse output feature map and its layered sparse bitmap are generated after the sparse, quantization, and compression process.

The GEPP and GEPM operation utilize GEBP as an underlying multiplication engine. In one embodiment, the GEPM operation is selected for cache or bandwidth constraint device. GEPM outputs matrix slice by slice so that the following relu operation, max pooling operation (if implemented), im2col or Winograd transformation can be calculated in a pipelined fashion. The uncompressed output can be generated slice by slice so that the some or all compression steps can be performed without waiting for the completion of uncompressed output.

Figure 9:
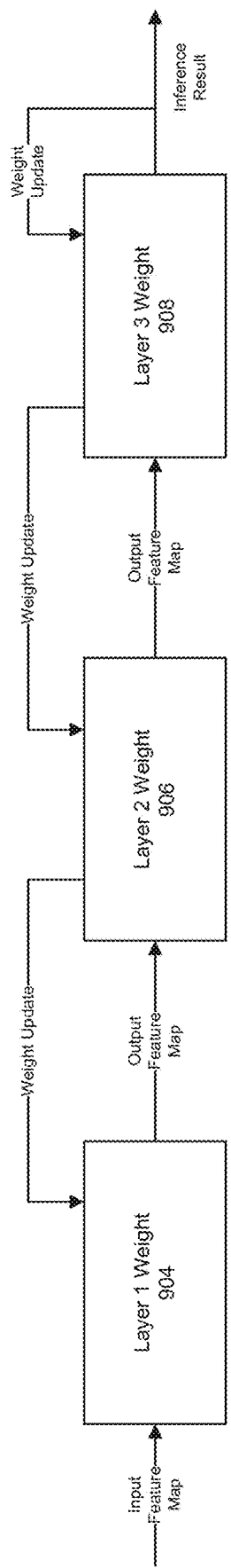
FIG. 9 illustrates an example neural network training apparatus.

FIG. 9 illustrates an example neural network training apparatus. The neural network training apparatus may be used to implement the training or retraining process described above. As illustrated, an input feature map (x) is processed by a number of neural layers 904, 906 and 908 to generate an inference result (y). The inference result is compared with a ground truth (g), based on which a loss (L(y,g)) is computed. The loss L is used to update the weights of each neural layer 904, 906, 908 through back propagated (BP). It is appreciated that any number of neural layers may be employed, and that it is not limited to the illustrated three neural layers.

Figure 10:
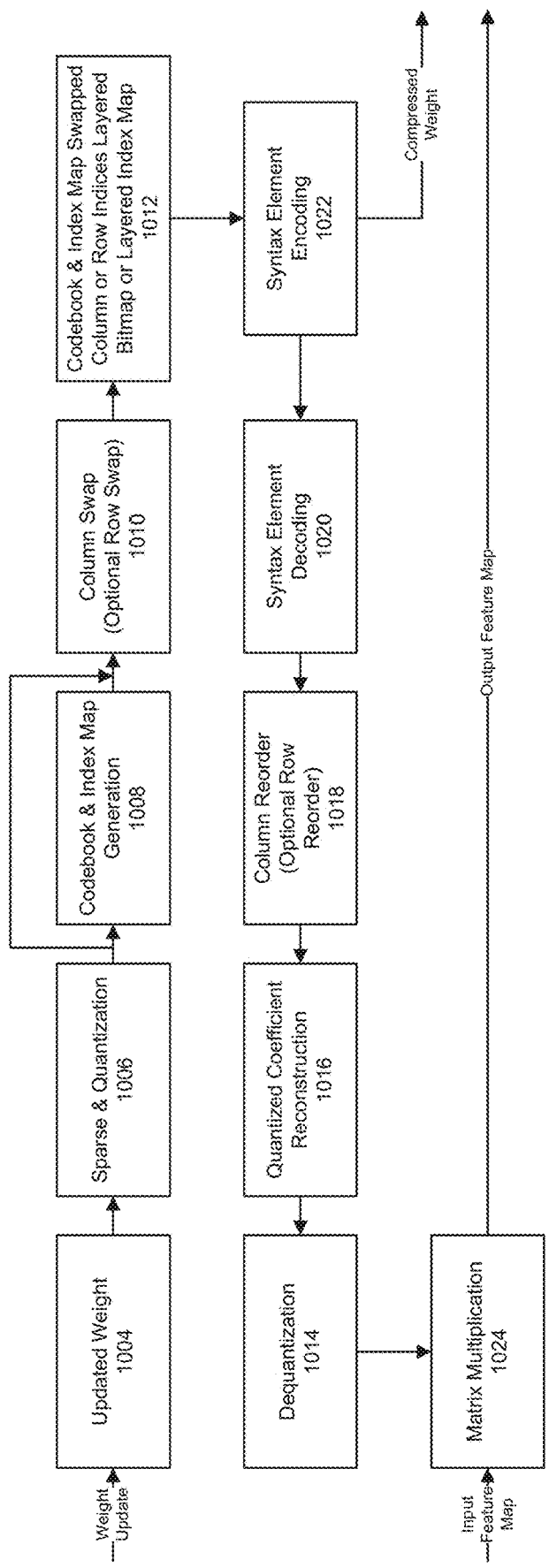
FIG. 10 illustrates an example of a neural network inference apparatus.

FIG. 10 illustrates a detailed embodiment of the neural network training apparatus of FIG. 9. In the disclosed embodiment, the training apparatus is an iterative process. When the input feature map (x) is processed by the neural layer 904, 906 and 908 to generate the inference result (y) during each iteration, the weights of the neural layers 904, 906 and 908 are temporarily fixed. For purposes of discussion, if $W_{i,t}$ denotes the weights of the $i^{th}$ neural layer at the $t^{th}$ iteration, $W_{i,t}$ is obtained from $W_{i,t-1}$ through the following processing steps, where steps 1004-1012 are the encoding steps and steps 1022-1014 are the decoding steps:

1. At step 1004, weight $W_{i,t-1}$ is updated into $W_{i,t}(0)$ by BP optimization, such as the Stochastic Gradient Descent (SGD) method, based on the computed loss $L(\{y_j, g_j\})$ by comparing a batch of inference results $(y_1, \ldots, y_n)$ and the corresponding ground-truth results $(g_1, \ldots, g_n)$, where each inference result $y_j$, j=1, . . . , n is obtained by processing the corresponding input feature maps $x_j$, j=1, . . . , n using the number of neural layer units.
2. Process $W_{i,t}(0)$ using Sparse and Quantization at step 1006 to generate quantized weight coefficients $W_{i,t}(q)$. The Sparse and Quantization first "sparsifies" the weight coefficients by performing weight pruning, as described in the "Sparse Bitmap Layout of Input Feature Map" section above, to reduce the number of non-zero weight coefficients. The sparsified weight coefficients are then quantized by performing weight quantization as described in the "Coefficients Quantization and K-means Clustering" section.
3. Based on the quantized weight coefficients $W_{i,t}(q)$, a codebook $C_{i,t}$ is generated at the Codebook and Index Map step 1008, which is used to convert $W_{i,t}(q)$ into an index map $M_{i,t}$. $M_{i,t}$ and further reduces the number of bits needed to represent each weight coefficient. The process is described in both the "Coefficients Quantization and K-means Clustering" section and the "K-means Centroids (Palette) Sharing" section. In one embodiment, and depending on the adaptive CU partition and RD calculation, an empty codebook may be generated for some given CU, and in such a case, the index map $M_{i,t}$ is simply the original $W_{i,t}(q)$.
4. At step 1010, the index map $M_{i,t}$ is further processed by a Column Swap (and optional Row Swap) to generate a column reordered and optimal row reordered index map $M_{i,t}(re)$. $M_{i,t}(re)$ has a better weight distribution for later compression than $M_{i,t}$ in general. The column (and optimal row) swap process is described above.
5. The data needed for computing decoded weight coefficients $W_{i,t}$ for neural network inference in the $i^{th}$ layer at the $t^{th}$ iteration, including the reordered index map Mi,t (re) and the parameters and hyper-parameters in steps 1004-1012, are grouped together at step 1012 into a syntax element set $S_{i,t}$, which is further processed by a Syntax Element Encoding at step 1022 to generate an encoded syntax element set $S_{i,t}(en)$. In one embodiment, a lossless syntax element encoding method such as Huffman coding is used.
6. The encoded syntax element set $S_{i,t}(en)$ is processed by the Syntax Element Decoding step 1020 to compute a decoded syntax element set $S_{i,t}(de)$. In a preferred embodiment, $S_{i,t}(de)=S_{i,t}$, with lossless syntax element encoding-decoding method.
7. Using the corresponding information in $S_{i,t}$, i.e., the column swap (and optimal row swap) information, and the decoded reordered index map $M_{i,t}(re)$, a reconstructed index map $M_{i,t}'$ can be computed in the Column Reorder (and Optional Row Reorder) step 1018. Similarly, $M_{i,t}=M_{i,t}'$ with lossless syntax element encoding-decoding.
8. Using the decoded codebook in the decoded syntax element set $S_{i,t}(de)$ and the reconstructed index map $M_{i,t}'$, the Quantized Coefficient Reconstruction step 1016 reconstructs the quantized weight coefficients $W_{i,t}'(q)$.
9. The reconstructed quantized weight coefficients $W_{i,t}'(q)$ are further processed by the Dequantization step 1014 to obtain dequantized weight coefficients $W_{i,t}$.

Once the dequantized weight coefficients $W_{i,t}$ are generated for the $i^{th}$ neural network layer at the $t^{th}$ iteration, the Matrix Multiplication step 1024 will compute an output feature map $O_{i,t}$ based on $W_{i,t}$, and an input feature map $I_{i,t}$. $I_{i,t}=O_{i-1,t}$ if i>1. Otherwise, $I_{i,t}$ is the input feature map x for the $1^{st}$ layer. Similarly, $O_{i,t}=O_{i+1,t}$ if the $i^{th}$ layer is not the last layer, and $O_{i,t}=y_t$ otherwise. The loss at the $i^{th}$ iteration can then be computed based on $y_t$ and ground truth g for x, and the above process iterates into the next iteration t+1.

Figure 11:
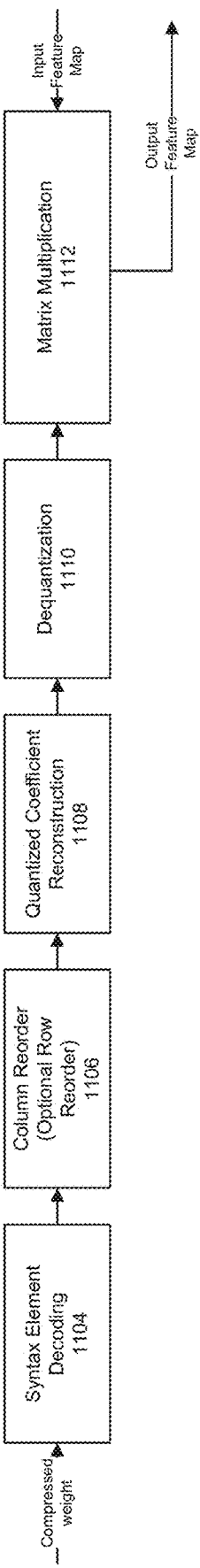
FIG. 11 illustrates an example apparatus for decoding a compressed input feature map.

FIG. 11 illustrates an example embodiment of a neural network inference apparatus. Similar to FIG. 9, the input feature map x is processed by a number of neural layers to generate the inference result y. More specifically, the inference apparatus first decodes the weight coefficients of the neural layers (904, 906 and 908 of FIG. 9) and then computes the output inference result through a feed forward computation.

For purposes of discussion, $W_i$ denotes the weights of the $i^{th}$ neural layer, $S_i(en)$ denotes the encoded syntax element set of the $i^{th}$ layer, and $M_i(re)$ denotes the reordered index map of the $i^{th}$ layer, the following steps 1104-1112 are performed:

1. The encoded syntax element set $S_i(en)$ is processed by the Syntax Element Decoding step 1104 to compute a decoded syntax element set $S_i(de)$.
2. Using the corresponding information in the syntax element set $S_i$, i.e., the column swap (and optimal row swap) information and the decoded reordered index map $M_i(re)$, a reconstructed index map $M_i'$ can be computed in the Column Reorder and Optional Row Reorder step 1106.
3. Using the decoded codebook in the decoded syntax element set $S_i(de)$ and the reconstructed index map $M_i'$, the Quantized Coefficient Reconstruction step 1108 reconstructs the quantized weight coefficients $W_i'(q)$.
4. The reconstructed quantized weight coefficients $W_i'(q)$ are further processed by the Dequantization step 1110 to obtain dequantized weight coefficients $W_i$.

Once the dequantized weight coefficients $W_i$ are generated for the $i^{th}$ neural network 904, 906 and 908 at the $t^{th}$ iteration, the Matrix Multiplication step 1112 computes an output feature map $O_i$ based on $W_i$ and an input feature map $I_i$. $I_i=O_{i-1}$ if $i>1$. The input feature map (x) is $I_i$ for the $1^{st}$ layer. Similarly, $O_i=I_{i+1}$ if the $i^{th}$ layer is not the last layer, and $O_i=y$ otherwise.

Figure 12:
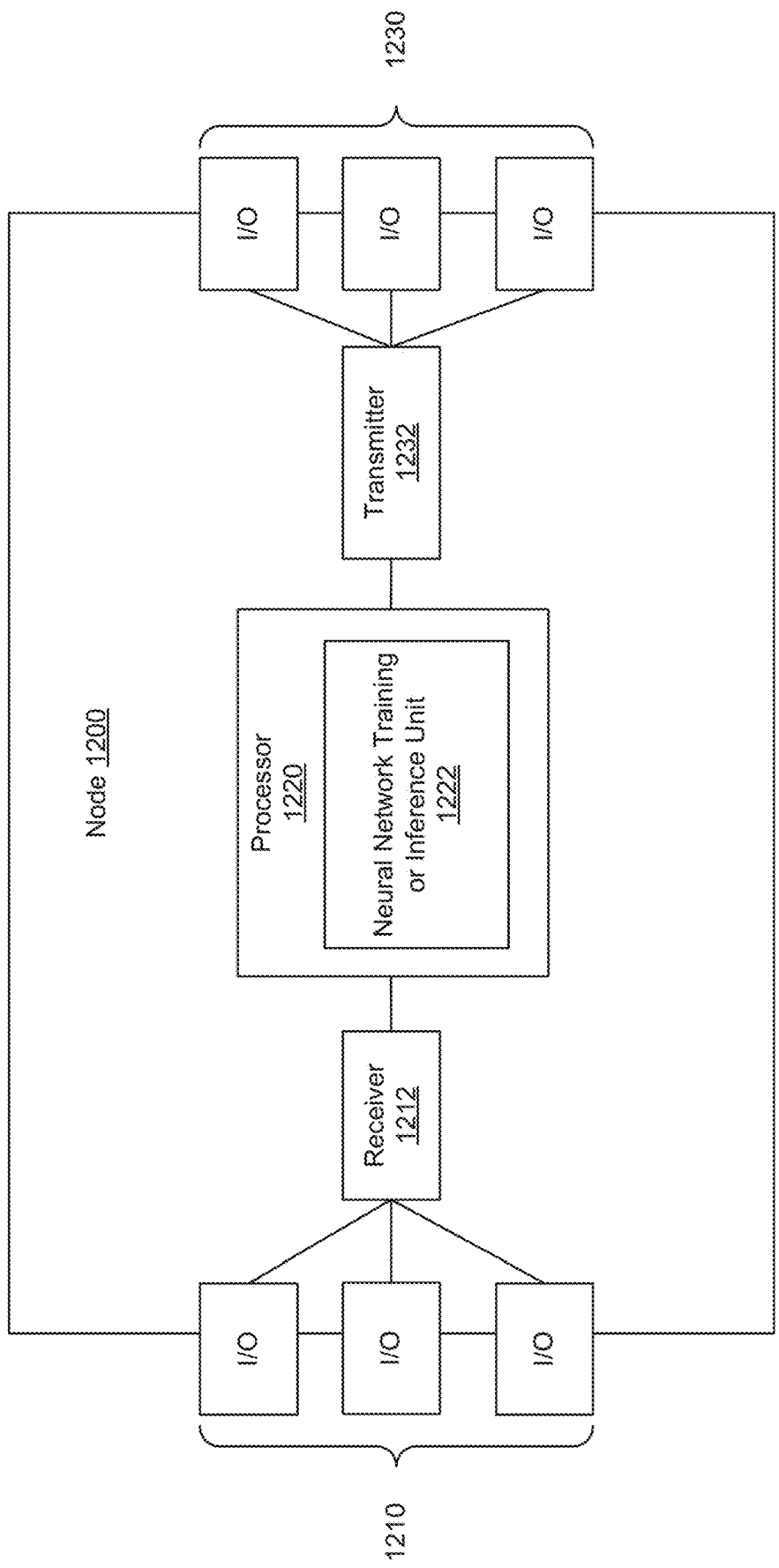
FIG. 12 illustrates an embodiment of a router in accordance with embodiments of the disclosure.

FIG. 12 illustrates an embodiment of a router in accordance with embodiments of the disclosure. The node (e.g., a server) 1200 may be, for example, any of the computing devices 102(1)-102(N) or 104(1)-104(N) in the system of FIG. 1 or any other node as described above. The node 1200 may comprise a plurality of input/output ports 1210/1230 and/or receivers (Rx) 1212 and transmitters (Tx) 1232 for receiving and transmitting data from other nodes, a processor 1220, including a neural network training or Inference Unit 1222 to process data and determine the inference result. The neural network training or inference unit or processor may be configured to implement either training or inference schemes described herein, such as encoding and decoding weight and/or input feature map using sparse, column swap and/or palette sharing concept described above. The neural network training or inference unit or processor may be implemented using hardware, software, or both.

Although illustrated as a single processor, the processor 1220 is not so limited and may comprise multiple processors. The processor 1220 may be implemented as one or more central processing unit (CPU) chips, cores (e.g., a multi-core processor), field-programmable gate arrays (FPGAs), application specific integrated circuits (ASICs), and/or digital signal processors (DSPs), and/or may be part of one or more ASICs. The processor 1220 may be configured to implement any of the schemes described herein using any one or combination of steps described in the embodiments. Moreover, the processor 1220 may be implemented using hardware, software, or both.

Figure 13:
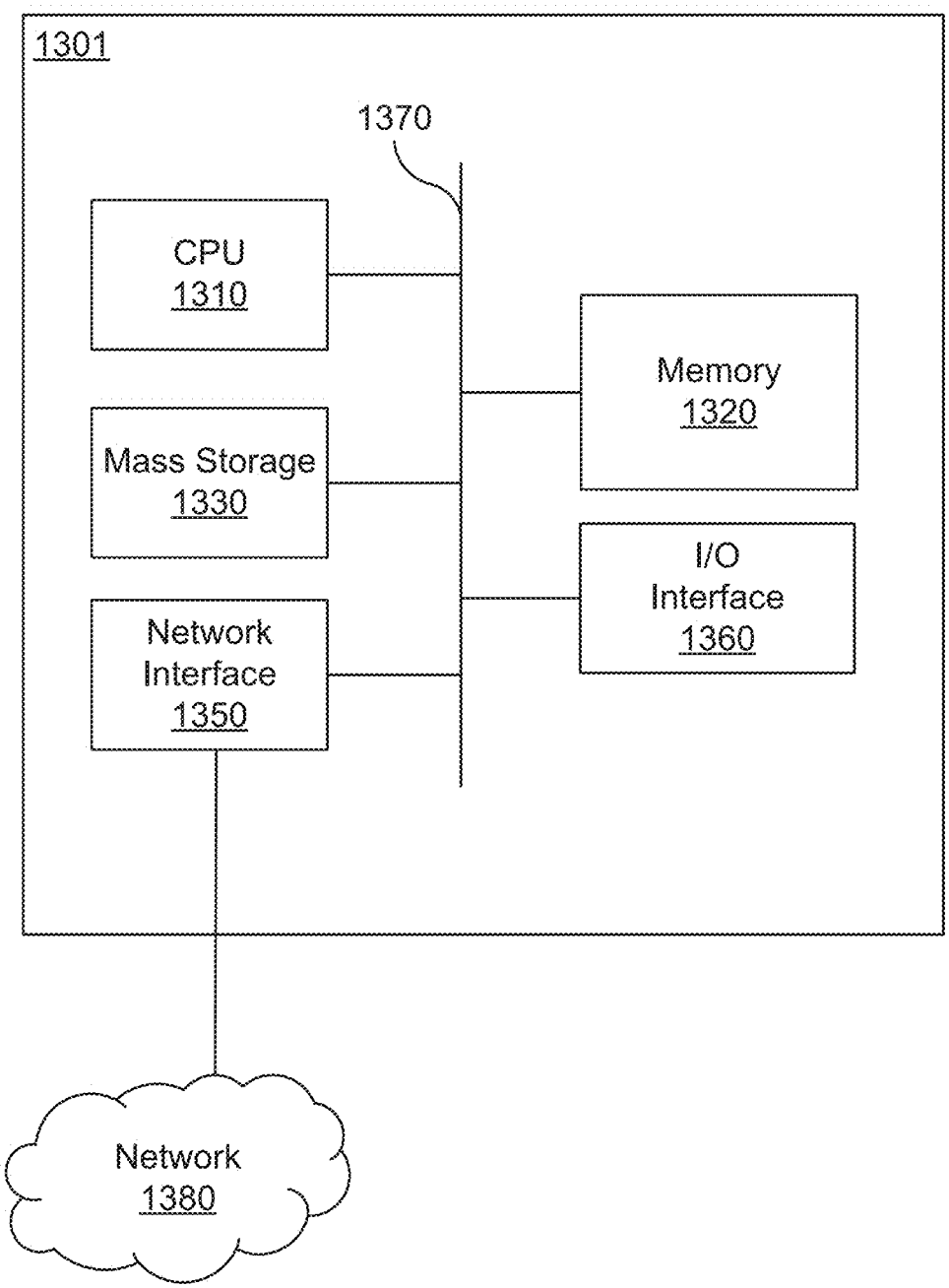
FIG. 13 illustrates a computing system upon embodiments of the disclosure may be implemented.

FIG. 13 illustrates a computing system upon embodiments of the disclosure may be implemented. The schemes described above may be implemented on any general-purpose network component, such as a computer or network component with sufficient processing power, memory resources, and network throughput capability to handle the necessary workload placed upon it. Computing system 1300 may be programmed (e.g., via computer program code or instructions) to provide improve compression, inference speed and lower power consumption as described herein and includes a communication mechanism such as a bus 1310 for passing information between other internal and external components of the computer system 1300. In one embodiment, the computer system 1300 is system 100 of FIG. 1. Computer system 1300, or a portion thereof, constitutes a means for performing one or more steps for implementing one or more embodiments of the methods disclosed herein, such as the weight and/or input feature map encoding and decoding methods. A bus 1310 includes one or more parallel conductors of information so that information is transferred quickly among devices coupled to the bus 1310. One or more processors 1302 for processing information are coupled with the bus 1310.

One or more processors 1302 performs a set of operations on information (or data) as specified by computer program code related to the execution by the neural network training or inference unit and/or processor to implement the training or inference methods described above. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1310 and placing information on the bus 1310. Each operation of the set of operations that can be performed by the processor is represented to the processor by information called instructions, such as an operation code of one or more digits. A sequence of operations to be executed by the processor 1302, such as a sequence of operation codes, constitute processor instructions, also called computer system instructions or, simply, computer instructions.

Computer system 1300 also includes a memory 1304 coupled to bus 1310. The memory 804, such as a random access memory (RAM) or any other dynamic storage device, stores information including processor instructions for compression, inference speed and lower power consumption as described herein. Dynamic memory allows information stored therein to be changed by the computer system 1300. RAM allows a unit of information stored at a location called a memory address to be stored and retrieved independently of information at neighboring addresses. The memory 1304 is also used by the processor 1302 to store temporary values during execution of processor instructions. The computer system 1300 also includes a read only memory (ROM) 1306 or any other static storage device coupled to the bus 1310 for storing static information. Also coupled to bus 1310 is a non-volatile (persistent) storage device 1308, such as a magnetic disk, optical disk or flash card, for storing information, including instructions.

In one embodiment, information, including instructions for providing compression, inference speed and lower power consumption as described herein, is provided to the bus 1310 for use by the processor from an external input device 1312, such as a keyboard operated by a human user, a microphone, an Infrared (IR) remote control, a joystick, a game pad, a stylus pen, a touch screen, head mounted display or a sensor. A sensor detects conditions in its vicinity and transforms those detections into physical expression compatible with the measurable phenomenon used to represent information in computer system 1300. Other external devices coupled to bus 1310, used primarily for interacting with humans, include a display device 1314 for presenting text or images, and a pointing device 1316, such as a mouse, a trackball, cursor direction keys, or a motion sensor, for controlling a position of a small cursor image presented on the display 1314 and issuing commands associated with graphical elements presented on the display 1314, and one or more camera sensors 1384 for capturing, recording and causing to store one or more still and/or moving images (e.g., videos, movies, etc.) which also may comprise audio recordings.

In the illustrated embodiment, special purpose hardware, such as an application specific integrated circuit (ASIC) 1320, is coupled to bus 1310. The special purpose hardware is configured to perform operations not performed by processor 1302 quickly enough for special purposes.

Computer system 1300 also includes a communications interface 1370 coupled to bus 1310. Communication interface 1370 provides a one-way or two-way communication coupling to a variety of external devices that operate with their own processors. In general the coupling is with a network link 1378 that is connected to a local network 880 to which a variety of external devices, such as a server or database, may be connected. Alternatively, link 1378 may connect directly to an Internet service provider (ISP) 1384 or to network 1390, such as the Internet. The network link 1378 may be wired or wireless. For example, communication interface 1370 may be a parallel port or a serial port or a universal serial bus (USB) port on a personal computer. In some embodiments, communications interface 1370 is an integrated services digital network (ISDN) card or a digital subscriber line (DSL) card or a telephone modem that provides an information communication connection to a corresponding type of telephone line. In some embodiments, a communication interface 1370 is a cable modem that converts signals on bus 1310 into signals for a communication connection over a coaxial cable or into optical signals for a communication connection over a fiber optic cable. As another example, communications interface 1370 may be a local area network (LAN) card to provide a data communication connection to a compatible LAN, such as Ethernet. Wireless links may also be implemented. For wireless links, the communications interface 1370 sends and/or receives electrical, acoustic or electromagnetic signals, including infrared and optical signals, which carry information streams, such as digital data. For example, in wireless handheld devices, such as mobile telephones like cell phones, the communications interface 1370 includes a radio band electromagnetic transmitter and receiver called a radio transceiver. In certain embodiments, the communications interface 870 enables connection to a communication network for providing compression, inference speed and lower power consumption as described herein.

Network link 1378 typically provides information using transmission media through one or more networks to other devices that use or process the information. For example, network link 1378 may provide a connection through local network 1380 to a host computer 1382 or to equipment 1384 operated by an ISP. ISP equipment 1384 in turn provide data communication services through the public, world-wide packet-switching communication network of networks now commonly referred to as the Internet 1390.

A computer called a server host 1382 connected to the Internet hosts a process that provides a service in response to information received over the Internet. For example, server host 1382 hosts a process that provides information representing video data for presentation at display 1314. It is contemplated that the components of system 1300 can be deployed in various configurations within other computer systems, e.g., host 1382 and server 1382.

At least some embodiments of the disclosure are related to the use of computer system 1300 for implementing some or all of the techniques described herein. According to one embodiment of the disclosure, those techniques are performed by computer system 1300 in response to processor 1302 executing one or more sequences of one or more processor instructions contained in memory 1304. Such instructions, also called computer instructions, software and program code, may be read into memory 1304 from another computer-readable medium such as storage device 1308 or network link 1378. Execution of the sequences of instructions contained in memory 1304 causes processor 1302 to perform one or more of the method steps described herein, such as neural network training or inference and implementation of the training or inference methods described above.

In one or more other embodiments, there is a computer implemented method of decoding a compressed neural network weight tensor, the method comprising: receiving an encoded quantized weight tensor, an encoded 2D sparse bitmap, an encoded plurality of column swapping indexes; decoding the encoded quantized weight tensor; decoding the encoded 2D sparse bitmap; decoding the column swapping indexes; optionally, receiving an encoded codebook of a plurality of centroids, and decoding the encoded codebook if an encoded codebook is received; generating a column swapped quantized weight tensor by swapping columns of the decoded quantized weight tensor according to the decoded column swapping indexes; generating a dequantized column swapped weight tensor by dequantizing the column swapped quantized weight tensor, by using the decoded codebook if the encoded codebook is received, or by using direct dequantization otherwise; and reordering the dequantized weight tensor according to the decoded 2D sparse bitmap.

In another embodiment there is a computer implemented method of accelerating matrix multiplication using a layered sparse bitmap, the method comprising: receiving at least one neural network tensor and a matching layered sparse bitmap; using the layered sparse bitmap as additional input to GEBP library; and skipping the multiplication operation of a block of the coefficients of the neural network tensor if the content of the layered sparse bitmap indicates that all coefficients in the block are zero.

Optionally, in any one of the above embodiments, the block of coefficients of the neural network tensor further comprises a group of coefficients in the current layer as well as the corresponding child coefficients in child layers in a tree structure.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The computer-readable non-transitory media includes all types of computer readable media, including magnetic storage media, optical storage media, and solid state storage media and specifically excludes signals. It should be understood that the software can be installed in and sold with the device. Alternatively the software can be obtained and loaded into the device, including obtaining the software via a disc medium or from any manner of network or distribution system, including, for example, from a server owned by the software creator or from a server not owned but used by the software creator. The software can be stored on a server for distribution over the Internet, for example.

Computer-readable storage media (medium) exclude (excludes) propagated signals per se, can be accessed by a computer and/or processor(s), and include volatile and non-volatile internal and/or external media that is removable and/or non-removable. For the computer, the various types of storage media accommodate the storage of data in any suitable digital format. It should be appreciated by those skilled in the art that other types of computer readable medium can be employed such as zip drives, solid state drives, magnetic tape, flash memory cards, flash drives, cartridges, and the like, for storing computer executable instructions for performing the novel methods (acts) of the disclosed architecture.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method of generating a compressed neural network, comprising:
   receiving a weight tensor from a neural network to be compressed;
   reordering the weight tensor of the neural network to be compressed to have an inner two-dimensional (2D) shape of a 2D sparse bitmap, wherein the 2D sparse bitmap is determined by matching an underlying matrix multiplication General Block Panel Multiplication (GEBP) left-hand-side (lhs) matrix blocking structure;
   generating a layered structure comprising one or more layers to represent the reordered weight tensor;
   dividing the reordered weight tensor into one or more group of weight coefficients (GOCs);
   generating a quantized reordered weight tensor;
   generating a column swapped quantized reordered weight tensor by swapping columns of the quantized reordered weight tensor according to a plurality of column swapping indexes of the 2D sparse bitmap to modify rows in the quantized reordered weight tensor having at least one parameter with a non-zero value to become rows in which all parameters are zero thereby allowing GEBP multiplication for the rows in the quantized reordered weight tensor in which all parameters are zero to be skipped;
   encoding the column swapped quantized reordered weight tensor, the 2D sparse bitmap according to the layered structure and the plurality of column swapping indexes to form a compressed representation of the neural network; and
   transmitting the compressed representation of the neural network to a target system.

2. The computer-implemented method of claim 1, further comprising:
   generating a codebook including a plurality of centroids in response to selecting an encoding mode that uses the codebook;
   wherein generating the quantized reordered weight tensor includes using the codebook of the plurality of centroids to represent the GOC by mapping the weight coefficients in the GOC to a corresponding one of the plurality of centroids; and
   wherein forming the compressed representation of the neural network further includes encoding the codebook including the plurality of centroids.

3. The computer-implemented method of claim 2, wherein the codebook of the plurality of centroids is determined by a clustering algorithm.

4. The computer-implemented method of claim 2, wherein the mapping of the weight coefficients in the GOC further comprises:
   assigning each weight coefficient to a corresponding one of the plurality of centroids based on a distance between each weight coefficient and the corresponding centroid; or
   determining whether the weight coefficient is an escape coefficient, and
   assigning each of the weight coefficients to a corresponding one of the plurality of centroids based on a distance between the weight coefficient and the corresponding one of the plurality of centroids in response to the weight coefficient not being an escape coefficient, and assigning the weight coefficient a special value in response to the weight coefficient being an escape coefficient.

5. The computer-implemented method of claim 4, wherein the special value is a number of centroids in the codebook when the weight coefficient is the escape coefficient.

6. The computer-implemented method of claim 2, wherein generating the codebook in response to the selected encoding mode using the codebook, comprises:
defining a maximum allowable size for a palette predictor having a plurality of centroids;
initializing the codebook of the plurality of centroids using the weight coefficients from one of the one or more GOCs;
comparing the codebook of the plurality of centroids with the palette predictor;
replacing the plurality of centroids in the codebook with the plurality of centroids in the palette predictor based on a rate distortion selection; and
iteratively updating the palette predictor with the plurality of centroids in the codebook after encoding each of the one or more GOCs.

7. The computer-implemented method of claim 1, wherein generating the quantized reordered weight tensor includes using direct quantization in response to selecting an encoding mode that uses direct quantization.

8. The computer-implemented method of claim 1, wherein the layered structure matches one of the underlying matrix multiplication GEBP lhs matrix blocking structure, a quad-tree block structure, or is defined to efficiently represent the 2D sparse bitmap.

9. The computer-implemented method of claim 1, further comprising encoding of the 2D sparse bitmap to include:
a depth-wise binary tree scanning order in response to there being more than one layer in the layered structure, and
one of a row-wise raster order, a column-wise raster order, a zigzag order, an order that follows a General Panel Panel Multiplication (GEPP)/General Block Panel Multiplication (GEBP) or a General Panel Matrix Multiplication (GEPM)/GEBP matrix blocking structure in response to there being one layer in the layered structure.

10. The computer-implemented method of claim 9, wherein:
the GOCs each have an arbitrarily predefined size or match the matrix blocking structure when the reordered weight tensor is divided into multiple GOCs; and
the GOC is the size of the reordered weight tensor when there is a single GOC for the reordered weight tensor.

11. The computer-implemented method of claim 1, further comprising selecting an encoding mode to generate the quantized reordered weight tensor based on an encoding rate distortion measurement, wherein the encoding rate distortion measurement is set to optimize compression quality, inference speed and power consumption.

12. A non-transitory computer-readable medium storing computer instructions for generating a compressed neural network, that when executed by one or more processors, cause the one or more processors to perform the steps of:
receiving a weight tensor from a neural network to be compressed;
reordering the weight tensor of the neural network to be compressed to have an inner two-dimensional (2D) shape of a 2D sparse bitmap, wherein the 2D sparse bitmap is determined by matching an underlying matrix multiplication General Block Panel Multiplication (GEBP) left-hand-side (lhs) matrix blocking structure;
generating a layered structure comprising one or more layers to represent the reordered weight tensor;
dividing the reordered weight tensor into one or more group of weight coefficients (GOCs);
generating a quantized reordered weight tensor;
generating a column swapped quantized reordered weight tensor by swapping columns of the quantized reordered weight tensor according to a plurality of column swapping indexes of the 2D sparse bitmap to modify rows in the quantized reordered weight tensor having at least one parameter with a non-zero value to become rows in which all parameters are zero thereby allowing GEBP multiplication for the rows in the quantized reordered weight tensor in which all parameters are zero to be skipped;
encoding the column swapped quantized reordered weight tensor, the 2D sparse bitmap according to the layered structure and the plurality of column swapping indexes to form a compressed representation of the neural network; and
transmitting the compressed representation of the neural network to a target system.

13. The non-transitory computer-readable medium of claim 12, wherein the instructions, which when executed by one or more processors, cause the one or more processors to perform the further steps of:
generating a codebook including a plurality of centroids in response to selecting an encoding mode that uses the codebook;
wherein generating the quantized reordered weight tensor includes using the codebook of the plurality of centroids to represent the GOC by mapping the weight coefficients in the GOC to a corresponding one of the plurality of centroids; and
wherein forming the compressed representation of the neural network further includes encoding the codebook including the plurality of centroids.

14. The non-transitory computer-readable medium of claim 13, wherein the codebook of the plurality of centroids is determined by a clustering algorithm.

15. The non-transitory computer-readable medium of claim 13, wherein the mapping of the weight coefficients in the GOC further comprises:
assigning each weight coefficient to a corresponding one of the plurality of centroids based on a distance between each weight coefficient and the corresponding centroid; or
determining whether the weight coefficient is an escape coefficient, and
assigning each of the weight coefficients to a corresponding one of the plurality of centroids based on a distance between the weight coefficient and the corresponding one of the plurality of centroids in response to the weight coefficient not being an escape coefficient, and assigning the weight coefficient a special value in response to the weight coefficient being an escape coefficient.

16. The non-transitory computer-readable medium of claim 15, wherein the special value is a number of centroids in the codebook when the weight coefficient is the escape coefficient.

17. The non-transitory computer-readable medium of claim 13, wherein the instructions, which when executed by one or more processors, cause the one or more processors to perform the step of generating the codebook in response to the encoding mode selected, further comprises:
defining a maximum allowable size for a palette predictor having a plurality of centroids;
initializing the codebook of the plurality of centroids using the weight coefficients from one of the one or more GOCs;
comparing the codebook of the plurality of centroids with the palette predictor;
replacing the plurality of centroids in the codebook with the plurality of centroids in the palette predictor based on a rate distortion selection; and
iteratively updating the palette predictor with the plurality of centroids in the codebook after encoding each of the one or more GOCs.

18. The non-transitory computer-readable medium of claim 12, wherein generating the quantized reordered weight tensor includes using direct quantization in response to selecting an encoding mode that uses direct quantization.

19. The non-transitory computer-readable medium of claim 12, wherein the layered structure matches one of the underlying GEBP lhs matrix blocking structure, a quad-tree block structure, or is defined to efficiently represent the 2D sparse bitmap.

20. The non-transitory computer-readable medium of claim 12, wherein the instructions, which when executed by one or more processors, cause the one or more processors to perform the further step of encoding of the 2D sparse bitmap to include:
a depth-wise binary tree scanning order when there are more than one layer in the layered structure, and
one of a row-wise raster order, a column-wise raster order, a zigzag order, an order that follows a General Panel Panel Multiplication (GEPP)/General Block Panel Multiplication (GEBP) or a General Panel Matrix Multiplication (GEPM)/GEBP matrix blocking structure when there is one layer in the layered structure.

21. The non-transitory computer-readable medium of claim 20, wherein
the GOCs each have an arbitrarily predefined size or match the matrix blocking structure when the reordered weight tensor is divided into multiple GOCs; and
the GOC is the size of the reordered weight tensor when there is a single GOC for the reordered weight tensor.

22. The non-transitory computer-readable medium of claim 12, further comprising selecting an encoding mode to generate the quantized reordered weight tensor based on an encoding rate distortion measurement, wherein the encoding rate distortion measurement is set to optimize compression quality, inference speed and power consumption.

\* \* \* \* \*